US012300852B2

(12) United States Patent
Yen

(10) Patent No.: US 12,300,852 B2
(45) Date of Patent: May 13, 2025

(54) BATTERY SEPARATOR, BATTERY INCLUDING THE SEPARATOR, AND METHOD AND SYSTEM FOR FORMING SAME

(71) Applicant: William Winchin Yen, Arlington, MA (US)

(72) Inventor: William Winchin Yen, Arlington, MA (US)

( * ) Notice: Subject to any disclaimer, the term of this patent is extended or adjusted under 35 U.S.C. 154(b) by 587 days.

(21) Appl. No.: 17/638,638

(22) PCT Filed: Aug. 27, 2020

(86) PCT No.: PCT/US2020/048134
§ 371 (c)(1),
(2) Date: Feb. 25, 2022

(87) PCT Pub. No.: WO2021/041627
PCT Pub. Date: Mar. 4, 2021

(65) Prior Publication Data
US 2022/0311097 A1    Sep. 29, 2022

Related U.S. Application Data

(60) Provisional application No. 62/966,862, filed on Jan. 28, 2020, provisional application No. 62/892,283, filed on Aug. 27, 2019.

(51) Int. Cl.
*H01M 50/457*    (2021.01)
*H01M 10/0525*    (2010.01)
(Continued)

(52) U.S. Cl.
CPC ..... *H01M 50/457* (2021.01); *H01M 10/0525* (2013.01); *H01M 50/403* (2021.01); *H01M 50/417* (2021.01)

(58) Field of Classification Search
CPC .................................................. C08J 2377/02
See application file for complete search history.

(56) References Cited

U.S. PATENT DOCUMENTS

| 3,426,754 A | 2/1969 | Bierenbaum et al. |
| 3,558,764 A | 1/1971 | Isaacson et al. |
| (Continued) | | |

FOREIGN PATENT DOCUMENTS

| CN | 101072671 A | 11/2007 |
| CN | 103493252 A | 1/2014 |
| (Continued) | | |

OTHER PUBLICATIONS

Lim WO-2014092485 Machine Translation (Year: 2014).*
(Continued)

*Primary Examiner* — Ula C Ruddock
*Assistant Examiner* — Anna Korovina
(74) *Attorney, Agent, or Firm* — KRIEGSMAN & KRIEGSMAN

(57) ABSTRACT

Microporous sheet product suitable for use as a battery separator and method of forming the same. According to one embodiment, the method involves forming an extrusion mixture of one or more thermoplastic polymers and a fluid having a high vapor pressure. Next, the mixture is extruded through a die head, cooled and shaped in a first vapor zone under an above-UEL condition to form a solid sheet material. Next, the sheet material is subjected to a two-step process in a second vapor zone under a below-LEL condition, the first step involving a first stretching/fluid vaporization at a higher temperature, the second step involving a second stretching/fluid vaporization at a lower temperature. The resultant sheet is then annealed, and the remainder of
(Continued)

fluid is removed to form a sheet product having a thickness characterized by a structure of smaller and larger pore strata across its thickness.

19 Claims, 5 Drawing Sheets

(51) Int. Cl.
*H01M 50/403* (2021.01)
*H01M 50/417* (2021.01)

(56) References Cited

U.S. PATENT DOCUMENTS

| | | | |
|---|---|---|---|
| 3,679,538 A | 7/1972 | Druin et al. | |
| 3,679,540 A | 7/1972 | Zimmerman et al. | |
| 4,287,276 A | 9/1981 | Lundquist, Jr. et al. | |
| 4,994,335 A | 2/1991 | Kamaei et al. | |
| 5,328,760 A | 7/1994 | Gillberg-LaForce | |
| 5,503,791 A | 4/1996 | Fortuin et al. | |
| 6,365,299 B1* | 4/2002 | Miyaki | H01M 4/131 |
| | | | 429/251 |
| 7,887,727 B2 | 2/2011 | Lee et al. | |
| 8,486,555 B2 | 7/2013 | Usami et al. | |
| 9,159,978 B2 | 10/2015 | Yen | |
| 9,761,872 B2 | 9/2017 | Pszolla et al. | |
| 10,098,191 B2 | 10/2018 | Foret | |
| 10,586,965 B2 | 3/2020 | Yen | |
| 10,829,600 B2 | 11/2020 | Yen | |
| 11,021,584 B2 | 6/2021 | Yen | |
| 2002/0045091 A1* | 4/2002 | Kamei | H01M 50/494 |
| | | | 429/62 |
| 2005/0250838 A1 | 11/2005 | Challapalli et al. | |
| 2007/0092777 A1 | 4/2007 | Zhamu et al. | |
| 2007/0138682 A1 | 6/2007 | Lee et al. | |
| 2009/0053190 A1 | 2/2009 | McKerracher | |
| 2009/0098450 A1* | 4/2009 | Kikuchi | H01M 50/457 |
| | | | 156/229 |
| 2009/0142657 A1 | 6/2009 | Yen | |
| 2009/0305127 A1 | 12/2009 | Miller et al. | |
| 2010/0041779 A1 | 2/2010 | Lee et al. | |
| 2011/0019340 A1 | 1/2011 | Nobuta et al. | |
| 2011/0133355 A1 | 6/2011 | Takita et al. | |
| 2013/0029126 A1 | 1/2013 | Yen | |
| 2013/0189553 A1 | 7/2013 | Enghardt | |
| 2015/0270522 A1* | 9/2015 | Yamada | H01M 50/44 |
| | | | 429/145 |
| 2017/0152359 A1 | 6/2017 | Yen | |
| 2017/0166716 A1 | 6/2017 | Yen | |
| 2017/0214021 A1 | 7/2017 | Yen | |
| 2019/0036116 A1 | 1/2019 | Lu et al. | |
| 2020/0099031 A1* | 3/2020 | Kai | H01M 50/423 |
| 2021/0024710 A1 | 1/2021 | Yen | |
| 2021/0214513 A1 | 7/2021 | Yen | |

FOREIGN PATENT DOCUMENTS

| | | | |
|---|---|---|---|
| CN | 103608389 A | 2/2014 | |
| CN | 107078259 A | 8/2017 | |
| EP | 1911352 A1 | 4/2008 | |
| JP | S5286199 A | 7/1977 | |
| JP | 2016013660 A | 1/2016 | |
| WO | 2007049568 A1 | 5/2007 | |
| WO | 200773019 A1 | 6/2007 | |
| WO | 200872906 A1 | 6/2008 | |
| WO | 200746496 A2 | 4/2009 | |
| WO | 200951278 A2 | 4/2009 | |
| WO | 2012138398 A1 | 10/2012 | |
| WO | 2012174209 A2 | 12/2012 | |
| WO | WO-2014092485 A1 * | 6/2014 | H01M 2/145 |
| WO | 2016028989 A1 | 2/2016 | |

OTHER PUBLICATIONS

Kuo et al., Advances in Filament Yarn Spinning of Textiles and Polymers, Chapter 5, Gel spinning of synthetic polymer fibres, 2014, pp. 100-112, DOI : 10.1533/9780857099174.2.100 (Year: 2014).*

International Search Report mailed Jan. 19, 2021, in PCT Application No. PCT/US2020/048134.

Written Opinion mailed Jan. 19, 2021, in PCT Application No. PCT/US2020/048134.

* cited by examiner

BATTERY SEPARATOR, BATTERY INCLUDING THE SEPARATOR, AND METHOD AND SYSTEM FOR FORMING SAME

CROSS-REFERENCE TO RELATED APPLICATIONS

The present application claims the benefit under 35 U.S.C. 119(e) of U.S. Provisional Patent Application No. 62/892,283, inventor William Winchin Yen, filed Aug. 27, 2019, and of U.S. Provisional Patent Application No. 62/966,862, inventor William Winchin Yen, filed Jan. 28, 2020, the disclosures of both of which are incorporated herein by reference.

BACKGROUND OF THE INVENTION

The present invention is directed generally to microporous sheet products and is directed more particularly to a novel microporous sheet product, to the use of said microporous sheet product as a battery separator, to an electrochemical storage battery including said battery separator, and to a novel method and system for forming said microporous sheet product.

Microporous sheet products are well-known articles commonly used in items as diverse as, for example, electrochemical storage batteries, food packaging materials, and ultrafiltration devices. For example, in electrochemical storage batteries, microporous sheet products are commonly used as battery separators. Typically, an electrochemical storage battery includes either a single electrochemical cell or a plurality of electrochemical cells that are electrically connected to one another and that are housed within a common housing. Each electrochemical cell typically includes a pair of electrodes of opposite polarity. The current flow between the pair of electrodes is maintained by an electrolyte. Depending on the nature of the battery system, the electrolyte may be acidic, alkaline, or substantially neutral. A battery separator is typically provided in each cell of an electrochemical storage battery between the electrodes of opposite polarity to prevent direct contact between the oppositely charged electrode plates since such direct contact would result in a short circuit of the cell.

In general, it is highly desirable for the separator to possess one or more of the following qualities: (i) to be thin and lightweight to aid in providing a cell of high energy density; (ii) to have a structure that inhibits dendrite formation between the electrode plates; (iii) to have the ability to enhance the uptake of the electrolytic composition over the electrode plates and, in so doing, to promote a substantially uniform distribution of the electrolytic composition over the electrode plates (an effect generally referred to as wicking); and (iv) to provide the property of freely permitting electrolytic conduction. It is further highly desirable for the separator to be made in an economical and environmentally safe manner while being substantially free of defects, such as pinholes and the like.

One common type of battery separator comprises a microporous sheet product that is formed by extruding a composition that includes a polyolefin and a liquid plasticizer and, thereafter, removing the plasticizer to produce a sheet with a microporous structure. Typically, such plasticizers are made of high molecular weight oils and the like, with the idea being that such plasticizers provide compatible properties with respect to the polymeric material during the initial steps of formation of the sheet while being incompatible and readily extractable during the later steps of formation of the sheet. Extraction is typically done by washing the plasticizer from the cooled initially formed sheet using a compatible, low molecular weight second liquid. The voids resulting from the removal of the plasticizer provide substantially uniform porosity throughout the resultant separator sheet product. The resultant mixed liquid is a waste by-product of the described process. An example of a separator made by such a process is disclosed in U.S. Pat. No. 4,287,276, inventors Lundquist, Jr. et al., which issued Sep. 1, 1981, and which is incorporated herein by reference.

Another technique for forming a microporous sheet product comprises stretching and annealing a polyolefin sheet material in order to create a microporosity in the treated sheet. Examples of this type of technique are disclosed in the following documents, all of which are incorporated herein by reference: U.S. Pat. No. 3,426,754, inventors Bierenbaum et al., which issued Feb. 11, 1969; U.S. Pat. No. 3,558,764, inventors Isaacson et al., which issued Jan. 26, 1971; U.S. Pat. No. 3,679,538, inventors Druin et al., which issued Jul. 25, 1972; U.S. Pat. No. 4,994,335, inventors Kamaei et al., which issued Feb. 19, 1991; and U.S. Pat. No. 5,328,760, inventor Gillberg-LaForce, which issued Jul. 12, 1994.

Another example of the aforementioned technique is disclosed in U.S. Pat. No. 3,679,540, inventors Zimmerman et al., which issued Jul. 25, 1972, and which is incorporated herein by reference. In the aforementioned patent, there is disclosed a process for preparing open-celled microporous polymer films from non-porous, crystalline, elastic polymer starting films, which process includes (1) cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat setting the resulting porous film under tension, i.e., at substantially constant length, to impart stability to the film. According to the patent, the elastic starting film is preferably made from crystalline polymers such as polypropylene by melting extruding the polymer into a film, taking up the extrudate at a drawdown ratio giving an oriented film, and thereafter heating or annealing the oriented film if necessary to improve or enhance the initial crystallinity.

One drawback of the aforementioned technique that has been recognized by the present inventor is that, in practice, the porosity of the resultant film is often limited to less than about 40% and is not well controlled.

Additional techniques for forming a microporous sheet product are disclosed in other patents and publications. For example, in U.S. Pat. No. 5,503,791, inventors Fortuin et al., which issued Apr. 2, 1996, and which is incorporated herein by reference, there is disclosed a method of forming a microporous film of polyethylene. According to the aforementioned patent, the method involves extruding a solution of a polyolefin in a first solvent, followed by cooling, the removal of the solvent and stretching of the film, in which both sides of the film are brought into close contact with a second solvent for the polyolefin before the film is contacted with a cooling agent (e.g., water).

In U.S. Pat. No. 9,159,978 B2, inventor Yen, which issued Oct. 13, 2015, and which is incorporated herein by reference, there is disclosed a sheet product and a method of forming the sheet product suitable for use as a battery separator. The method comprises forming a mixture of a thermoplastic polymer and a fluid having a high vapor pressure, shaping the mixture into a sheet material, and subjecting the sheet material to stretching/fluid vaporization at high temperature to form an intermediate material having a ratio of percent fluid to percent polymer crystallinity of between 0.15 and 1, followed by a second stretching/fluid vaporization at a lower temperature while removing a portion of the remainder of the fluid from the sheet. The resultant sheet is annealed and remainder of fluid is removed to form a sheet product having a thickness comprising a stratified structure of small and larger pore strata configuration across its thickness.

In U.S. Pat. No. 8,486,555 B2, inventors Usami et al., which issued Jul. 16, 2013, and which is incorporated herein by reference, there is disclosed a process for producing a porous laminate having many micropores interconnected in the thickness direction, which comprises: a step in which a laminate is produced which comprises at least three layers comprising an interlayer made of a thermoplastic resin having a hard segment and a soft segment and two nonporous outer layers made of a filler-containing resin and located as outer layers respectively on both sides of the interlayer; a step in which the laminate obtained is impregnated with a supercritical or subcritical fluid and this state is relieved to vaporize the fluid and thereby make the interlayer porous; and a step in which the two nonporous outer layers located respectively on both sides are made porous by stretching.

In U.S. Pat. No. 10,586,965 B2, inventor Yen, which issued Mar. 10, 2020, and which is incorporated herein by reference, there is disclosed a microporous sheet product made by a process that includes melt-extruding a sheet material using an extrusion mixture that includes (i) a cyclic olefin copolymer, (ii) an electrolyte swellable thermoplastic, and (iii) a compatibilizing agent that promotes mixing of the cyclic olefin copolymer and the electrolyte swellable thermoplastic. As an example, the cyclic olefin copolymer may be an ethylene-norbornene copolymer, the electrolyte swellable thermoplastic may be polyethylene oxide, and the compatibilizing agent may be mineral spirits.

In U.S. Patent Application Publication No. US 2007/0092777 A1, inventors Zhamu et al., which issued Apr. 26, 2007, and which is incorporated herein by reference, there is disclosed a self-humidifying proton exchange membrane (PEM) composition comprising (a) a proton-conducting polymer; (b) a catalyst that promotes the chemical reaction between hydrogen and oxygen molecules to generate water in the membrane, and (c) a deliquescent material dispersed in this polymer. The deliquescent material absorbs and retains an essentially constant amount of moisture to keep the proton mobile in the PEM structure.

Other documents that may be of interest may include the following, all of which are incorporated herein by reference: U.S. Patent Application Publication No. US 2017/0166716 A1, inventor Yen, which was published Jun. 15, 2017; and U.S. Patent Application Publication No. US 2017/0152359 A1, inventor Yen, which was published Jun. 1, 2017.

Existing techniques for separator manufacturing typically require steps to cast and to extract low volatility plasticizer oil out of the separator network. Such techniques often use a cooling roll to directly contact an extruded cast separator base sheet. However, when such a cooling roll is used, a 30 to 50 micron thick skin layer typically forms on the surface of the sheet, which is undesirable. This skin layer, which is well known in the membrane industry, causes lower porosity and smaller pore size on sheet surfaces, resulting in reduced ionic conductivity for battery applications.

There are numerous types of lithium-based primary and secondary electrochemical storage systems, examples of such systems including, but not being limited to, lithium thionyl chloride systems, lithium manganese dioxide systems, lithium iron sulfide systems, and lithium ion phosphate systems. Of the various lithium-based electrochemical storage systems, one of the more common types is commonly referred to simply as a lithium-ion battery. A lithium-ion battery may comprise a single lithium-ion cell or, alternatively, may comprise a plurality of electrically connected lithium-ion cells. Each cell of a lithium-ion battery typically comprises an anode, a cathode, an electrolyte, and a separator. The anode is typically made of carbon, such as graphite. The cathode is typically made of a metal oxide, such as $LiCoO_2$ or $LiMn_2O_4$. The electrolyte typically comprises an organic solvent with a lithium salt dissolved therein. For example, the organic solvent is often a mixture of organic carbonates, such as a mixture of ethylene carbonate and diethyl carbonate. The lithium salt may be lithium hexafluorophosphate ($LiPF_6$).

Pure lithium is highly reactive and vigorously reacts with water to form substances like lithium hydroxide and hydrogen gas. Hydrofluoric acid may also be produced. As can be appreciated, the production of lithium hydroxide, hydrogen gas, and hydrofluoric acid in a lithium-ion cell is highly undesirable as such products can impair cell performance and can present an environmental hazard if leaked from the cell. It is for this reason that the electrolyte solvent in a lithium-ion cell is typically a non-aqueous electrolyte of the type described above. Moreover, to minimize the likelihood that a reaction of lithium with water may occur, the components of the cell are typically housed within a sealed container that is intended to prevent the ingress of water into the cell. Nevertheless, despite such efforts, some water typically makes its way into the cell, often during cell assembly, or is entrapped in one or more of the battery components, such as the metal oxide cathode. Some manufacturers try to counter this problem by vacuum drying the cell for a period of time at an elevated temperature (e.g., 8 hours at 85° C.) as part of the cell manufacturing process. However, even with such drying and even at concentrations as low as 10 ppm, water can begin catalyzing a host of degradation products that may impair cell performance or that may present an environmental risk.

SUMMARY OF THE INVENTION

According to one aspect of the invention, there is provided a lithium-based battery cell, the lithium-based battery cell comprising: (a) an electrolyte, the electrolyte comprising a non-aqueous solvent and a lithium salt, the lithium salt dissolved in the non-aqueous solvent; (b) an anode, the anode contacting the electrolyte; (c) a cathode, the cathode contacting the electrolyte; (d) a battery separator, the battery separator separating the anode and the cathode, wherein the battery separator is a microporous sheet product comprising a first polymer and a second polymer, the first polymer comprising a thermoplastic polymer, the second polymer comprising a condensation polymerization polymer that is produced in a dehydration polymerization reaction and that, when exposed to water, undergoes a reduction in molecular weight, wherein, at completion of cell manufacture, the second polymer has an initial total weight; and (e) a housing, wherein the electrolyte, the anode, the cathode, and the battery separator are disposed within the housing; (f) wherein, at completion of cell manufacture, an initial amount of water having an initial total weight is present within the housing and wherein a ratio of the initial total weight of the second polymer to the initial total weight of water is in a range of about 10:1 to 5,000:1.

In a more detailed feature of the invention, the first polymer may comprise at least one polyolefin.

In a more detailed feature of the invention, the at least one polyolefin may be selected from the group consisting of at least one polyolefin homopolymer, at least one polyolefin copolymer, at least one polyolefin terpolymer, and combinations thereof.

In a more detailed feature of the invention, the at least one polyolefin may be selected from the group consisting of polyethylene, polypropylene, ethylene-butene copolymers, ethylene-hexene copolymers, and combinations thereof.

In a more detailed feature of the invention, the at least one polyolefin may be selected from the group consisting of polyethylene homopolymers, polypropylene homopolymers, and copolymers thereof having up to about 10 weight percent of other alpha-olefins as co-monomeric units therein.

In a more detailed feature of the invention, the at least one polyolefin may have an average molecular weight of about 100,000 to 10,000,000 Da.

In a more detailed feature of the invention, the second polymer may have a minimum entanglement molecular weight of at least 1000 Da.

In a more detailed feature of the invention, the second polymer may have a minimum entanglement molecular weight of at least 4000 Da.

In a more detailed feature of the invention, the microporous sheet product may be made by a method comprising (a) melt-extruding an extrusion mixture to form a sheet material, the extrusion mixture comprising (i) the first polymer, (ii) the second polymer and (iii) a compatibilizing agent, the compatibilizing agent promoting mixing of the first and second polymers; and (b) then, cooling the sheet material, whereby micropores are formed in the sheet material.

In a more detailed feature of the invention, after exposure to water, the second polymer may undergo a reduction in average molecular weight of between 20% and 90%.

In a more detailed feature of the invention, the second polymer may be at least one member selected from the group consisting of polyamide, polyether, polyester, polyoxyethylene, polyethylene glycol, polypropylene glycol, polycarbonate, polyanhydride, polyimide, polybenzimidazole, polyacetal, polysulfone, polyphenylene oxide, and polyurethane.

In a more detailed feature of the invention, the second polymer may comprise at least one of a copolymer and a terpolymer.

In a more detailed feature of the invention, the second polymer may comprise a mixture of at least two polymers, and at least one of the at least two polymers may be a copolymer.

In a more detailed feature of the invention, an initial weight ratio of copolymer condensation polymer to total condensation polymer may be 0.1:1 to 0.9:1.

In a more detailed feature of the invention, an initial weight ratio of copolymer condensation polymer to total condensation polymer may be 0.2:1 to 0.85:1.

In a more detailed feature of the invention, an initial weight ratio of copolymer condensation polymer to total condensation polymer may be 0.3:1 to 0.8:1.

In a more detailed feature of the invention, the second polymer may comprise at least one polyamide.

In a more detailed feature of the invention, the at least one polyamide may be selected from the group consisting of at least one homopolymer, at least one copolymer, at least one terpolymer, and combinations thereof.

In a more detailed feature of the invention, the at least one polyamide may have a relative viscosity, as compared to m-Cresol, of at least 1.4:1.

In a more detailed feature of the invention, the ratio of the initial total weight of the second polymer to the initial total weight of water is at least 50:1.

In a more detailed feature of the invention, the ratio of the initial total weight of the second polymer to the initial total weight of water is at least 500:1.

In a more detailed feature of the invention, the second polymer may have an initial average molecular weight of at least 12,000 Da.

In a more detailed feature of the invention, the second polymer may have an initial average molecular weight of at least 20,000 Da.

In a more detailed feature of the invention, the second polymer may have an initial average molecular weight of at least 29,000 Da.

In a more detailed feature of the invention, the second polymer may be selected from the group consisting of polyoxyethylene and polypropylene glycol.

In a more detailed feature of the invention, the second polymer may have an initial molecular weight of at least 110,000 Da.

In a more detailed feature of the invention, the second polymer may have an initial molecular weight of at least 310,000 Da.

In a more detailed feature of the invention, the second polymer may have an initial molecular weight of at least 910,000 Da.

In a more detailed feature of the invention, the second polymer may have an initial molecular weight of at least 2,100,000 Da.

In a more detailed feature of the invention, the second polymer and the first polymer may have an initial average molecular weight ratio of below 2:1 and above 0.01:1.

In a more detailed feature of the invention, the second polymer and the first polymer may have an initial average molecular weight ratio of below 1:1.

In a more detailed feature of the invention, the second polymer and the first polymer may have an initial average molecular weight ratio of below 0.5:1.

In a more detailed feature of the invention, the second polymer and the first polymer may have an initial average molecular weight ratio of below 0.2:1.

In a more detailed feature of the invention, the second polymer and the first polymer may have an initial weight ratio of between 0.01:1 and 1:1.

In a more detailed feature of the invention, the second polymer and the first polymer may have an initial weight ratio of between 0.02:1 and 0.5:1.

In a more detailed feature of the invention, the second polymer and the first polymer may have an initial weight ratio of between 0.05:1 and 0.3:1.

In a more detailed feature of the invention, the second polymer and the first polymer may have an initial weight ratio of between 0.1:1 and 0.2:1.

In a more detailed feature of the invention, the compatibilizing agent may comprise at least one organic fluid, the first polymer may constitute about 10 to 60% by weight of the extrusion mixture, the second polymer may constitute about 2.1 to 9.9% by weight of the extrusion mixture, and the compatibilizing agent may constitute about 40 to 75% by weight of the extrusion mixture.

In a more detailed feature of the invention, the compatibilizing agent may be at least one member selected from the group consisting of hydrocarbon oils, organic esters, and phthalates.

In a more detailed feature of the invention, the compatibilizing agent may have a vapor pressure of about 1 to 50 mm Hg at 70° C., a vapor pressure of about 0.1 to 5 mm Hg at 20° C., and a boiling temperature of about 170 to 250° C. and wherein the compatibilizing agent may comprise a mixture of fluids having a boiling range of at least 20° C. in breadth.

In a more detailed feature of the invention, a ratio of average initial molecular weight of the second polymer to average final molecular weight of the second polymer may be at least 1:1 and less than 1000:1.

In a more detailed feature of the invention, the lithium-based battery cell may initially contain greater than 10 ppm of water.

In a more detailed feature of the invention, the lithium-based battery cell may initially contain greater than 40 ppm of water.

According to another aspect of the invention, there is provided a lithium-based battery cell, the lithium-based battery cell comprising: (a) an electrolyte, the electrolyte comprising a non-aqueous solvent and a lithium salt, the lithium salt dissolved in the non-aqueous solvent; (b) an anode, the anode contacting the electrolyte; (c) a cathode, the cathode contacting the electrolyte; (d) a battery separator, the battery separator separating the anode and the cathode, wherein the battery separator is a microporous sheet product comprising a first polymer and a second polymer, the first polymer comprising a thermoplastic polymer, the second polymer comprising a condensation polymerization polymer that is produced in a dehydration polymerization reaction and that, when exposed to water, undergoes a reduction in molecular weight, wherein, at completion of cell manufacture, the second polymer has an initial total weight; and (e) a housing, wherein the electrolyte, the anode, the cathode, and the battery separator are disposed within the housing; (f) wherein, at completion of cell manufacture, an initial amount of water is present within the housing and wherein the second polymer reacts with substantially all of the initial amount of water to undergo a reduction in molecular weight of about 20% to 90% and wherein the second polymer has a minimum entanglement molecular weight of at least 1000 Da.

According to still another aspect of the invention, there is provided a microporous sheet product, the microporous sheet product made by a method comprising the steps of (a) melt-extruding an extrusion mixture to form a cast sheet, wherein the extrusion mixture comprises at least one thermoplastic polymer and a compatibilizing agent, the compatibilizing agent comprising a first organic fluid; (b) cooling the cast sheet in a first gas zone, the first gas zone comprising a first organic vapor, the first organic vapor comprising the first organic fluid in vapor form, the first organic vapor being present within at least a portion of the first gas zone at an above-UEL concentration; and (c) performing at least some stretching of the cooled cast sheet in a second gas zone, the second gas zone comprising a second organic vapor, the second organic vapor comprising the first organic fluid in vapor form, the second organic vapor being present at a below-LEL concentration in the second gas zone.

In a more detailed feature of the invention, the at least one thermoplastic polymer may comprise at least one polyolefin.

In a more detailed feature of the invention, the at least one polyolefin may be selected from the group consisting of at least one polyolefin homopolymer, at least one polyolefin copolymer, at least one polyolefin terpolymer, and combinations thereof.

In a more detailed feature of the invention, the at least one polyolefin may be selected from the group consisting of polyethylene, polypropylene, ethylene-butene copolymers, ethylene-hexene copolymers, and combinations thereof.

In a more detailed feature of the invention, the at least one polyolefin may be selected from the group consisting of polyethylene homopolymers, polypropylene homopolymers, and copolymers thereof having up to about 10 weight percent of other alpha-olefins as co-monomeric units therein.

In a more detailed feature of the invention, the at least one polyolefin may have an average molecular weight of about 100,000 to 10,000,000 Da.

In a more detailed feature of the invention, the extrusion mixture may further comprise at least one condensation polymer, and the at least one condensation polymer, when exposed to water, may undergo a reduction in molecular weight.

In a more detailed feature of the invention, the at least one condensation polymer may have a minimum entanglement molecular weight of at least 1000 Da.

In a more detailed feature of the invention, the at least one condensation polymer may have a minimum entanglement molecular weight of at least 4000 Da.

In a more detailed feature of the invention, after exposure to water, the at least one condensation polymer may undergo a reduction in average molecular weight of between 20% and 90%.

In a more detailed feature of the invention, the at least one condensation polymer may be at least one member selected from the group consisting of polyamide, polyether, polyester, polyoxyethylene, polyethylene glycol, polypropylene glycol, polycarbonate, polyanhydride, polyimide, polybenzimidazole, polyacetal, polysulfone, polyphenylene oxide, and polyurethane.

In a more detailed feature of the invention, the at least one condensation polymer may comprise at least one of a copolymer and a terpolymer.

In a more detailed feature of the invention, the at least one condensation polymer may comprise a mixture of at least two polymers, and at least one of the at least two polymers may be a copolymer.

In a more detailed feature of the invention, an initial weight ratio of copolymer condensation polymer to total condensation polymer may be 0.1:1 to 0.9:1.

In a more detailed feature of the invention, an initial weight ratio of copolymer condensation polymer to total condensation polymer may be 0.3:1 to 0.8:1.

In a more detailed feature of the invention, the at least one condensation polymer may comprise at least one polyamide.

In a more detailed feature of the invention, the at least one polyamide may be selected from the group consisting of at least one homopolymer, at least one copolymer, at least one terpolymer, and combinations thereof.

In a more detailed feature of the invention, the at least one polyamide may have a relative viscosity, as compared to m-Cresol, of at least 1.4:1.

In a more detailed feature of the invention, the at least one polyamide may have a relative viscosity, as compared to m-Cresol, of at least 1.9:1.

In a more detailed feature of the invention, the at least one condensation polymer may have an initial average molecular weight of at least 12,000 Da.

In a more detailed feature of the invention, the at least one condensation polymer may have an initial average molecular weight of at least 29,000 Da.

In a more detailed feature of the invention, the at least one condensation polymer may be selected from the group consisting of polyoxyethylene and polypropylene glycol.

In a more detailed feature of the invention, the at least one condensation polymer may have an initial molecular weight of at least 110,000 Da.

In a more detailed feature of the invention, the at least one condensation polymer may have an initial molecular weight of at least 2,100,000 Da.

In a more detailed feature of the invention, the at least one condensation polymer and the at least one thermoplastic polymer may have an initial average molecular weight ratio of below 2:1 and above 0.01:1.

In a more detailed feature of the invention, the at least one condensation polymer and the at least one thermoplastic polymer may have an initial average molecular weight ratio of below 0.2:1.

In a more detailed feature of the invention, the at least one condensation polymer and the at least one thermoplastic polymer may have an initial weight ratio of between 0.01:1 and 1:1.

In a more detailed feature of the invention, the at least one condensation polymer and the at least one thermoplastic polymer may have an initial weight ratio of between 0.1:1 and 0.2:1.

In a more detailed feature of the invention, the compatibilizing agent may be at least one member selected from the group consisting of hydrocarbon oils, organic esters, and phthalates.

In a more detailed feature of the invention, the compatibilizing agent may have a vapor pressure of about 1 to 50 mm Hg at 70° C., a vapor pressure of about 0.1 to 5 mm Hg at 20° C., and a boiling temperature of about 170 to 250° C.

In a more detailed feature of the invention, the compatibilizing agent may comprise a mixture of fluids having a boiling range of at least 20° C. in breadth.

In a more detailed feature of the invention, the extrusion mixture may consist of the at least one thermoplastic polymer and the compatibilizing agent.

In a more detailed feature of the invention, the extrusion mixture may consist of the at least one thermoplastic polymer, the at least one condensation polymer, and the compatibilizing agent.

In a more detailed feature of the invention, the first organic vapor may consist of the first organic fluid in vapor form.

In a more detailed feature of the invention, the first organic vapor may comprise the first organic fluid in vapor form and a second organic fluid in vapor form.

In a more detailed feature of the invention, the first gas zone may be maintained at a temperature within a range of −20° C. to 160° C.

In a more detailed feature of the invention, the cast sheet may reside in the first gas zone for a period of 0.01 to 20 seconds.

In a more detailed feature of the invention, the first organic vapor may be present in the first gas zone at a concentration of at least 3% by volume.

In a more detailed feature of the invention, the first organic vapor may be present in the first gas zone at a concentration of at least 7% by volume.

In a more detailed feature of the invention, the first organic vapor may be present in the first gas zone at a concentration of at least 15% by volume.

In a more detailed feature of the invention, the first organic vapor may be present in the first gas zone at a concentration of at least 30% by volume.

In a more detailed feature of the invention, the first gas zone may be enclosed with an enclosure.

In a more detailed feature of the invention, a concentration ratio of the first organic vapor to oxygen in the first gas zone may be greater than 0.1:1.

In a more detailed feature of the invention, a concentration ratio of the first organic vapor to oxygen in the first gas zone may be greater than 0.5:1.

In a more detailed feature of the invention, a concentration ratio of the first organic vapor to oxygen in the first gas zone may be greater than 1:1.

In a more detailed feature of the invention, a concentration ratio of the first organic vapor to oxygen in the first gas zone may be greater than 2:1.

According to still yet another aspect of the invention, there is provided a method of manufacturing a microporous sheet product, the method comprising the steps of:
(a) melt-extruding an extrusion mixture to form a cast sheet, wherein the extrusion mixture comprises at least one thermoplastic polymer and a compatibilizing agent, the compatibilizing agent comprising a first organic fluid;
(b) cooling the cast sheet in a first gas zone, the first gas zone comprising a first organic vapor, the first organic vapor comprising the first organic fluid in vapor form, the first organic vapor being present within at least a portion of the first gas zone at an above-UEL concentration; and
(c) performing at least some stretching of the cooled cast sheet in a second gas zone, the second gas zone comprising a second organic vapor, the second organic vapor comprising the first organic fluid in vapor form, the second organic vapor being present at a below-LEL concentration in the second gas zone.

In a more detailed feature of the invention, the first organic vapor may be present in the first gas zone at a concentration of at least 3% by volume.

In a more detailed feature of the invention, a concentration ratio of the first organic vapor to oxygen in the first gas zone may be greater than 0.1:1.

In a more detailed feature of the invention, some of the first organic vapor may condense on a cast roll, forming a skin layer of condensate of fluid thereon, and said cooling step may comprise cooling the cast sheet on said skin layer of condensate on the cast roll.

In a more detailed feature of the invention, said above-UEL concentration may be attained by an egress of ambient oxygen from an enclosure defining the first gas zone.

In a more detailed feature of the invention, the enclosure may be constructed to minimize the ingress of water vapor thereinto.

In a more detailed feature of the invention, the melt-extruding step may comprise increasing extruder energy input by increasing extruder screw rpm and/or by adding kneading blocks.

In a more detailed feature of the invention, the first organic vapor may be present at an above-UEL concentration throughout an entirety of the first gas zone.

In a more detailed feature of the invention, the first organic vapor may be present at an above-UEL concentration in only a portion of the first gas zone.

In a more detailed feature of the invention, the first gas zone may be defined by an enclosure, cooling may be provided by at least one chilled roll, and the first organic vapor may be present at above-UEL concentration beginning at or near an entrance of the enclosure and extending to about the chilled roll.

According to a further aspect of the invention, there is provided a method, the method comprising the steps of: (a) providing a microporous sheet product, the microporous sheet product comprising a first polymer and a second polymer, the first polymer comprising a thermoplastic polymer, the second polymer comprising a condensation polymerization polymer that is produced in a dehydration polymerization reaction and that, when exposed to water, undergoes a reduction in molecular weight; and (b) incorporating the microporous sheet product into an electrochemical cell, wherein, at completion of cell manufacture, an initial amount of water having an initial total weight is present within the electrochemical cell and wherein a ratio of the initial total weight of the second polymer to the initial total weight of water is in a range of about 10:1 to 5,000:1.

In a more detailed feature of the invention, the second polymer may have a minimum entanglement molecular weight of at least 1000 Da.

According to a further aspect of the invention, there is provided a system for manufacturing a microporous sheet product.

In a more detailed feature of the invention, the system may comprise (a) an extruder, (b) a die head positioned at an outlet end of the extruder for emitting a cast sheet, (c) a first gas zone, the first gas zone configured to receive the cast sheet from the die head and to cool the cast sheet, the first gas zone comprising a first organic vapor, the first organic vapor comprising the first organic fluid in vapor form, the first organic vapor being present within at least a portion of the first gas zone at an above-UEL concentration, (d) a second gas zone, the second gas zone comprising a second organic vapor, the second organic vapor comprising the first organic fluid in vapor form, the second organic vapor being present at a below-LEL concentration in the second gas zone; and (e) means for stretching the cooled cast sheet, wherein at least some of the stretching means is positioned in the second gas zone.

In a more detailed feature of the invention, the first gas zone is enclosed in an enclosure.

In a more detailed feature of the invention, the first gas zone comprises a plurality of chilled rolls arranged in a S-wrap cast configuration.

In a more detailed feature of the invention, the first gas zone comprises one or more rolls arranged in a U-wrap cast configuration.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention, and together with the description, serve to explain the principles of the invention. In the drawings wherein like reference numerals represent like parts.

DETAILED DESCRIPTION OF THE INVENTION

Figure 1:
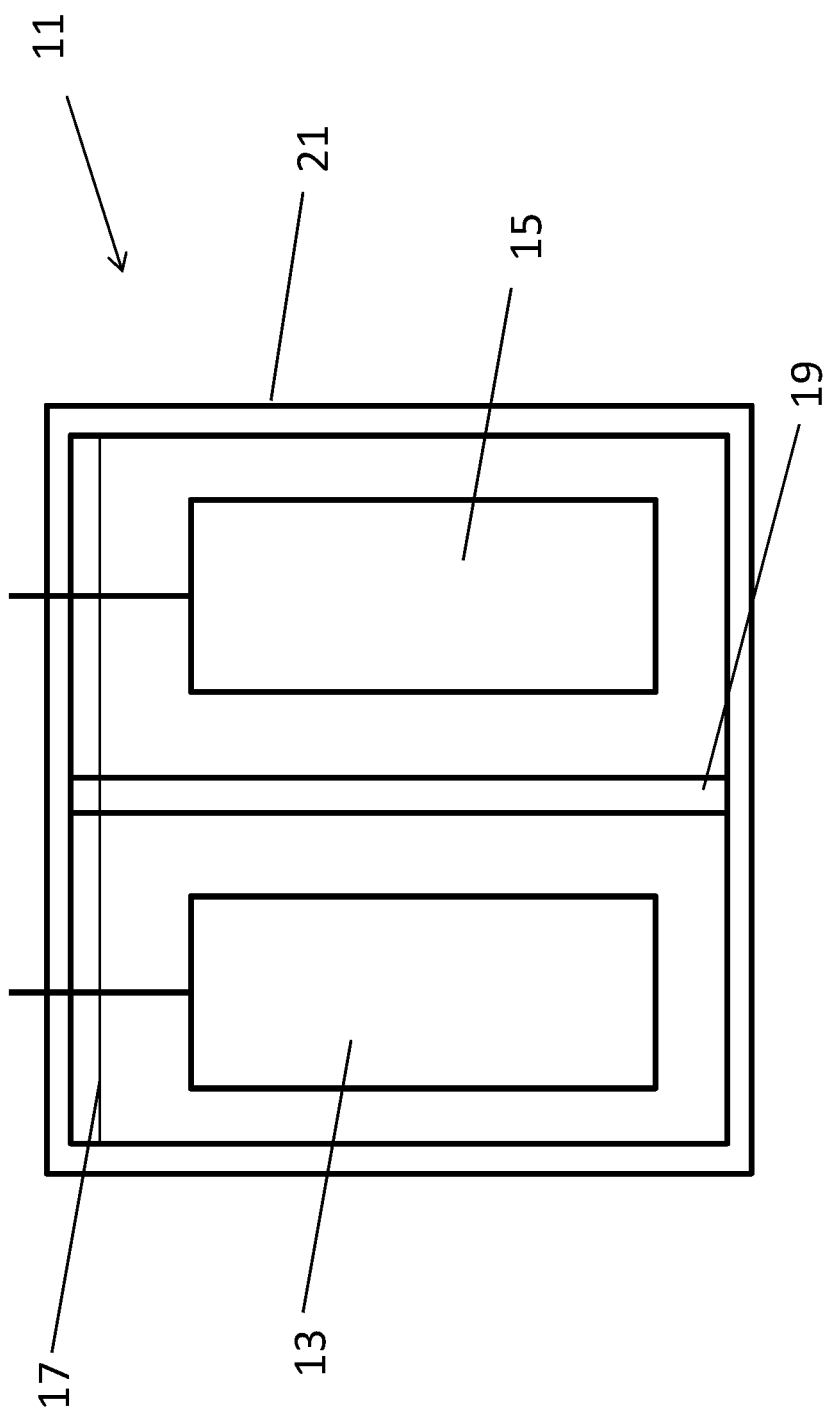
FIG. 1 is a schematic section view of one embodiment of an electrochemical cell according to the present invention.

The present invention is directed at a microporous sheet product, to the use of said microporous sheet product as a battery separator, to a battery cell including the battery separator, and to a method and system of manufacturing said microporous sheet product.

It has been unexpectedly found by the present inventor that, by using particular starting materials and/or a particular manufacturing method, a unique microporous sheet product having desirable characteristics (which may include, for example, uniform open porous surfaces) may be formed, the details of the foregoing starting materials and the foregoing manufacturing method being fully described below. In many cases, the method for manufacturing the subject microporous sheet product can be achieved at low manufacturing costs and in an environmentally desirable manner.

As discussed above, one problem that is commonly encountered in lithium-ion batteries is that the conducting salt $LiPF_6$ may react, in a hydrolysis reaction, with water in the battery electrolyte, producing unwanted substances like lithium hydroxide, hydrogen gas and/or hydrofluoric acid. The production of these unwanted products is undesirable as they may decrease battery performance and battery life and also may become a health hazard in the case of their leakage to the environment.

Consequently, a first aspect of the invention is incorporating a component into the microporous sheet product that may tend to minimize the extent of the aforementioned hydrolysis reaction with $LiPF_6$ and, in so doing, may tend to minimize the unwanted generation of products like lithium hydroxide, hydrogen gas and hydrofluoric acid, which may result from said hydrolysis reaction. According to one aspect of the invention, this may be achieved by incorporating a condensation polymerization polymer into the microporous sheet product, wherein the condensation polymerization polymer may preferentially undergo hydrolysis, instead of $LiPF_6$, thereby minimizing the above-described problems associated with the undesired production of unwanted products like lithium hydroxide, hydrogen gas and/or hydrofluoric acid. A non-limiting example of such a condensation polymerization polymer may be a polyamide. Polyamides may be produced by a dehydration reaction between monomers, i.e., a dicarboxylic acid and a diamine, or from an amino acid or its lactam, where water is the by-product of such a reaction. The linkage of the monomer molecules in a polyamide typically occurs through the formation of amide groups. The reverse of this polymerization reaction is hydrolysis, where the polyamide may act as a scavenger and react with water or acid. Accordingly, by incorporating such a polymer into a separator of a lithium ion battery, this polymer may scavenge water or acid from the battery, thereby minimizing battery degradation and prolonging battery cycle life. Acid may also act as a catalyst for the chain cleavage rehydration reaction to catalyze the hydration or hydrolysis of the scavenger polymer with water.

A second aspect of the invention is a novel method and system for manufacturing a microporous sheet product. In at least some embodiments, the microporous sheet product may consist of or may comprise a polymeric composition, which is preferably a polyolefin composition, and the microporous sheet product may have two major surfaces and a thickness therebetween. In at least some embodiments, the microporous sheet product may be formed by extruding or shaping, as an initially shaped material, a mixture consisting of or comprising (i) a moderate molecular weight polymer, preferably a polyolefin, having at least 30 percent crystallinity and (ii) from 10 to 60 weight percent, based on the total weight of the mixture, of an organic fluid having a boiling point of about 135 to 300° C. and a vapor pressure of about 1 to 50 mm Hg at 70° C., and in which the polymer is at least partially soluble. The mixture may be formed by blending the polymer and fluid at an elevated temperature. Upon formation of an initially shaped material (e.g., by extrusion of the mixture through a slit die head of an extruder), the shaped material or cast sheet may come into contact with a specific type of vapor zone, where the cast sheet may reside while cooling and initiating phase separation. The shaped material or cast sheet may be further cooled by a cooling medium on a chilled roll or in a cooling bath.

In at least some embodiments, the aforementioned vapor zone may be maintained with vapor of the organic fluid above an Upper Explosion Limit (UEL). Such maintenance of the organic fluid vapor above an Upper Explosion Limit may improve the compatibility of the cast sheet surfaces to the cooling medium (vapor and fluid), may encourage a distinct fluid to polymer (liquid to solid) phase separation, thereby causing increased open-cell pore growth rate of the cast sheet. Contact between a molten cast sheet and a non-compatible vapor or fluid may cause partial encapsulation of fluid by the polymer. This may result in small, tortuous or closed-cell pores, which may correspond with possibly sealed sheet surfaces, exhibiting poor electrolyte wet-out. In at least some embodiments, the cooling vapor and fluid may be maintained at a temperature below 160° C. and may comprise substantially the same organic fluid utilized in forming the initial mixture of polymer and fluid for a residence time sufficient to solidify the shaped material. After the shaped material exits the cooling zone of the gas above an Upper Explosion Limit, the shaped material may be further processed. More specifically, in at least some embodiments, after the cooling zone, the subsequent steps may be maintained in an environment below a Lower Explosion Limit (LEL) for the fluid.

The cooled shaped sheet material may then be subjected to a two-step stretching/fluid vaporization of the sheet with removal of defined amounts of the fluid from the shaped material. In the first stretching/fluid vaporization step, the initially shaped material may be stretched in at least the machine direction. The first stretched shaped material may then be subjected to a separate second stretching/vaporization step with stretching in the transverse direction (and, optionally, in the machine direction). The resultant second stretched shaped material may be subjected to certain prescribed elevated temperature annealing for a period of time while under machine or transverse tension to produce the desired resultant sheet product. The sheet product may be optionally relaxed in one or both stretched directions and stored to further improve dimensional stability.

A microporous sheet product comprising the above-described condensation polymer and/or formed under the above-described above-UEL and/or below-LEL conditions exhibits improved performance as a battery separator and may be used in lithium-based battery cells, as well as other types of battery cells.

The microporous sheet product of the present invention is preferably a highly porous unitary article suitable for use as an improved battery separator. The microporous sheet product may be viewed as having two major surfaces with a thickness therebetween. The thickness may consist of or comprise a series of alternating first and second interconnecting strata running substantially in the same direction as the major surfaces of the sheet product. Although the thickness of the present microporous sheet product may be composed of multiple strata, each stratum is preferably bound to an adjacent stratum or strata at the strata interfacial boundaries by connective polymeric elements to achieve a unitary structure.

For purposes of clarity, some of the terms used herein and in the appended claims to describe the subject invention may be defined below:

The term "cast sheet" may define a unitary article having two large surfaces with respect to its length and breadth dimensions and having a thickness between said surfaces. In general, the term may be used to describe a molten sheet upon exiting an extrusion die until the sheet has cooled and solidified into a solid and before stretching of the sheet.

The term "sheet material" may define a unitary article having two large surfaces with respect to its length and breadth dimensions and having a thickness between said surfaces. In general, the term may be used to describe structures produced during the initial extrusion or shaping of material into a sheet-like form and of material produced during any of the intermediate steps taught for forming a final sheet product.

The term "sheet product" may define a unitary resultant article having two large or major surfaces with respect to its length and breadth dimensions and having a thickness between said surfaces. The thickness of the resultant article may consist of or comprise a series of connected open pores from one surface to the second surface. The thickness of the sheet product may be about 0.1 to 10 mils (about 0.0025 to 0.25 mm).

The terms "strata" or "region" may be used interchangeably to define a distinct portion of the thickness of a unitary sheet product which runs in substantially the same length and breadth directions as that of the major surfaces although in a somewhat tortuous manner. Thus, a stratum may be positioned in a substantially parallel relationship to the major surfaces of the sheet product. Each stratum or region may form, merge or discontinue within the sheet product structure.

The term "first" may be used to modify terms that refer to a stratum or region having an average pore size of about 0.001 to 10 microns, preferably about 0.005 to 1 micron, more preferably about 0.01 to 0.5 micron, and that have an average pore size that is smaller than that of the alternating stratum adjacent thereto. The term "first" may also be used to modify and to refer to a liquid to be mixed with and to form a sheet material during the initial extrusion or shaping of material and the sheet material produced by an initial process step of a multi-step stretching/fluid vaporization of the sheet material. Additionally, as discussed further below, the term "first" may also be used to modify and to refer to one or more polymers used in forming the sheet product of the present invention.

The term "second" may be used to modify terms that refer to a continuous or discontinuous stratum or region of porosity having an average pore size (related to larger pore dimension) of at least 1 micron, preferably above 5 microns up to about 100 microns and that have an average pore size that is larger than that of the alternating stratum adjacent thereto. The term "second" may also be used to modify and to refer to a second process step of a multi-step stretching/fluid vaporization of the sheet material after that which has initially been formed and to distinguish the sheet material formed by the second stretching/fluid vaporization step. Additionally, as discussed further below, the term "second" may also be used to modify and to refer to one or more polymers used in forming the sheet product of the present invention.

The terms "fluid", "liquid" and "solvent", which may be used interchangeably, may refer to liquid components used in the formation of the initial polymer/fluid mixture to form the sheet material. These terms may also be used in reference to a liquid used in forming a cooling fluid, or to a medium on a chilled roll surface, or to a cooling bath for initial cooling of the formed cast sheet, or to a process fluid used in other steps for forming the subject sheet product, or to a fluid removed by each of the stretching/fluid vaporization steps.

The terms "gas" and "vapor", which may be used interchangeably, may refer to gas components used in the initial contacting medium of the extruded cast sheet. These terms may also be used in reference to a gas composition used in forming an above-UEL processing zone of the subject sheet material and/or a below-LEL processing zone of the subject sheet material.

The term "major surface" may refer to an outer surface of the sheet product and the stratum adjacent to said major surface. A first stratum (side exposed) may form each of the major surfaces of the sheet product.

The term "separator" may refer to a component of a battery, in particular a storage battery, by which the component may maintain a separation between adjacent electrode plates or elements of opposite polarity. The separator may be of various configurations, such as flat, ribbed, or corrugated sheet, which may be in the form of a membrane or envelope capable of maintaining separation of adjacent electrodes. The separator of the present invention may have a thickness of about 0.1 to 10 mils (about 0.0025 to 0.25 mm) although the exact thickness will be based on the battery design for which it is intended.

The term "crystallinity" may refer to a regular or structured orientation of polymer molecules with respect to each other within a polymer mass and may be distinguished from a random, irregular orientation of polymer molecules within a polymer mass. The crystallinity of a polymer mass can be determined in known manners by conventional x-ray diffraction analysis.

The term "UEL" may refer to Upper Explosion Limit or Upper Explosive Limit, which may be the highest concentration (percentage) of a gas or vapor in air capable of producing a flash of fire in the presence of an ignition source (e.g., arch, flame, heat). UEL may also sometimes be referred to as Upper Flammable Limit or UFL. Vapor concentrations higher than UEL may be regarded as "too rich" to burn and may be referred to herein as "above-UEL." Spaces, volumes or enclosures in which a gas or vapor is present in a concentration above-UEL may be referred to herein as above-UEL zones.

The term "LEL" may refer to Lower Explosion Limit or Lower Explosive Limit, which may be the lowest concentration (percentage) of a gas or vapor in air capable of producing a flash of fire in the presence of an ignition source (e.g., arch, flame, heat). Vapor concentrations lower than LEL may be regarded as not having sufficient hydrocarbon fuel to burn and may be referred to herein as "below-LEL." Spaces, volumes or enclosures in which a gas or vapor is present in a concentration below-LEL may be referred to herein as below-LEL zones.

The term "fluid bank" may refer to a pool of cooling fluid entrapped at the contact point between a cast sheet and the cooling surface of a cast roll. This cooling fluid may improve the thermal conductivity of the sheet and may be formed from the condensation of the same extrusion fluid vapor accumulated over time onto the cast roll surface.

The term "first polymer" may refer to a polyolefin polymer with an open cell porous network, contiguous from surface to surface of the sheet product.

The term "second polymer" may refer to a condensation polymerization polymer, melted and intermixed within the first polymer network, the condensation polymerization polymer having a shape after melt re-crystallization that may be in a fibril or particle form having a length and width. The second polymer may be surrounded by the first polymer and may be noncontiguous from surface to surface of the sheet product.

Material Specifications

According to one aspect of the present invention, there is provided a microporous sheet product suitable for use as a battery separator, the microporous sheet product being made by a method that comprises (a) melt-extruding an extrusion mixture to form a sheet material, the extrusion mixture consisting of or comprising (i) a first polymer, (ii) a second polymer, wherein the second polymer may serve as a condensation polymer to scavenge water or acid, for example, in a lithium-based cell, thereby minimizing the undesired hydrolysis in a lithium-based cell of lithium conducting salts like $LiPF_6$, and (iii) a compatibilizing agent, wherein the compatibilizing agent may promote mixing of the first and second polymers, whereby micropores are formed in the sheet material; and (b) then, cooling the sheet material.

Polymers that may be useful as the first polymer in the present invention may comprise one or more thermoplastic polymers of the type that are suitable for use in forming a microporous sheet by melt-extrusion. Such thermoplastic polymers may have a crystallinity of at least 30% and preferably have a crystallinity of at least 40%, with thermoplastic polymers having a crystallinity of about 50% to 90% being particularly preferred.

A preferred first polymer of the present invention may include one or more polyolefins. In particular, the one or more polyolefins of the present invention may comprise one or more homopolymers, copolymers (i.e., bipolymers) and/or terpolymers. More specifically, the first polymer may comprise polyethylene, polypropylene, ethylene-butene copolymers, ethylene-hexene copolymers, and the like, as well as mixtures thereof. A particularly preferred first polymer may comprise polyethylene and/or polypropylene homopolymers, as well as copolymers of these polymers having small amounts of up to about 10 weight percent, preferably about 1 to 10 weight percent, of other alpha-olefins ($C_3$-$C_{10}$ alpha olefins) as co-monomeric units therein, such as propylene, butene-1, hexene-1, etc. and mixtures thereof preferably produced using a single-site catalyst polymerization. The aforementioned polyethylene may be selected from high-density polyethylene, medium-density polyethylene, branched low-density polyethylene, and linear low-density polyethylene.

The first polymer may be selected from one or more polymers having an average molecular weight of about 100,000 to 10,000,000 Da, with moderate molecular weight polymers of about 200,000 Da to less than about 5,000,000 Da being preferred.

Melt flow index or MFI is a measure of the ease of flow of the melt of a thermoplastic polymer. MFI is defined as the mass flow of polymer, in grams, flowing in ten minutes through a capillary of a specific diameter and length by a pressure applied via prescribed alternative gravimetric weights for alternative prescribed temperatures. The method for determining MFI is described in ASTM D1238 and ISO 1133. Melt flow rate is an indirect measure of a polymer's molecular weight. Polymers with a molecular weight above 1,000,000 Da generally have MFI of 0. Preferred first polymers may have a Melt Flow Index (MFI) below about 0.8 and more preferably within a range of 0 to 0.1.

The first polymer may constitute about 10 to 60% by weight of the initial extrusion mixture.

The second polymer of the present invention, which is also sometimes referred to herein as the condensation polymer, may be one or more polymers from the group comprising polyamide, polyether, polyester, polyoxyethylene, polyethylene glycol, polypropylene glycol, polycarbonate, polyanhydride, polyimide, polybenzimidazole, polyacetal, polysulfone, polyphenylene oxide, polyurethane, and other polymers produced from a dehydration polymerization reaction. The first and second polymers may be blended in varying percentages or using different molecular weight materials of such polymers to form an initial sheet material and, ultimately, a singular sheet product. A preferred condensation polymer may be a copolymer, more preferably a terpolymer, where the condensation polymer may be generally more amorphous than the first polymer and may serve to improve separator puncture strength. Even more preferably, the condensation polymer may be a mixture of two or more polymers, at least one of the two or more polymers being a copolymer, with an initial weight ratio of the copolymer to the total condensation polymers being about 0.1:1 to 0.9:1, more preferably about 0.2:1 to 0.85:1, and even more preferably about 0.3:1 to 0.8:1.

When a polyamide is used as a second polymer, the polyamide may be named based on a specific chain length of a straight (aliphatic) or aromatic monomer, wherein the amide link is produced from an amine lactam group and a carboxylic acid group. For example, an aliphatic polyamide having a 6-carbon chain may be named polyamide 6. The longer the carbon chain of the polyamide, the greater the improvement there tends to be in molecular compatibility with the polyolefin in nanocompounding. Preferably, the polyamide may have a carbon chain of at least 6 carbons, more preferably at least 9 carbons, even more preferably at least 10 carbons, and still even more preferably at least 12 carbons. The polyamide may comprise one or more homopolymers, such as polyamide 9, polyamide 11, polyamide 12, and polyamide 13, one or more copolymers, such as polyamide 10/10, polyamide 6/9, polyamide 6/10, polyamide 6/12, and polyamide 13/13, or one or more terpolymers, such as polyamide 66/6/12, or a mixture of homopolymers, copolymers and/or terpolymers. When using one or more polyamides as the second polymer, the Relative Viscosity, measured as a ratio of the viscosity of the second polymer to the viscosity of m-Cresol, is preferably at least 1.4:1, more preferably at least 1.7:1, and even more preferably at least 1.9:1. The baseline viscosity of m-Cresol is 184 cP at 20° C. The polyamide viscosity may be measured by dissolving 0.5% polyamide in m-Cresol.

The average initial molecular weight of the condensation polymer may be at least 8,000 Da, more preferably at least 12,000 Da, even more preferably at least 20,000 Da, and still even more preferably at least 29,000 Da. When the microporous sheet product of the present invention is exposed to water, as may occur when the microporous sheet product is used as a separator in a storage battery, there may occur, to some extent, a reversal of the polymerization dehydration reaction. This reversal, in turn, may result in a reduction in the average molecular weight and viscosity of the second polymer of the microporous sheet product. The extent of the decrease in molecular weight of the second polymer resulting from such a reversal may depend on the percentages of water and second polymer present within the storage battery. For example, after water exposure, the ratio of the average initial molecular weight of the second polymer to the average final molecular weight of the second polymer may be in the range of 1:1 to 1000:1. More preferably, the reduction in the average molecular weight of the second polymer could be between about 90% and about 20% of the pre-extrusion (or initial) molecular weight of the second polymer. As can be appreciated, an extreme reduction in molecular weight of the second polymer is undesirable as a second polymer of a very low molecular weight may tend to migrate from within the microporous sheet product matrix into an electrolyte. Thus, a certain minimum entanglement of the second polymer with the microporous sheet product matrix is desirable, in order to maintain the integrity of the microporous sheet product and to prevent dendrite shorting when the microporous sheet product is used as a separator. The term "entanglement molecular weight" ($M_e$) is generally defined as a polymer chain that crosses an arbitrary plane 3 times and, thus, may be regarded as entangled. Examples of minimum entanglement ($M_e$) values of various polymers are provided below:

| Polymer | $M_e$ (g/mol or Da) |
| --- | --- |
| Polyethylene | 1160 |
| Polypropylene | 4595 |
| Polycarbonate | 2510 |
| Polyamide 6 | 2490 |
| Polyamide 6,6 | 2010 |
| Polyoxyethylene | 1850 |
| Polyethylene terephthalate | 1450 |
| Polysulfone | 2315 |

The second polymer minimum entanglement molecular weight may be specified at least 1000 Da, preferably at least 2000 Da, more preferably at least 3000 Da, and even more preferably at least 4000 Da. To obtain this minimum entanglement within a cell, the final second polymer molecular weight is dependent on the starting second polymer MW and the amount of water present. The second polymer of the present invention typically has an initial polymer molecular weight and a final polymer molecular weight (e.g., after exposure to $H_2O$, HF or $LiPF_6$, resulting in a hydrolysis cleavage reaction of the second polymer). This initial and final polymer MW reduction ratio due to hydrolysis cleavage can be expressed at $R_c$. For example, in the case of polyamide 6, which typically has a monomer molecular weight of 341 Da, and water, which typically has a molecular weight of 18 Da, the amount of initial second polymer and water that can be present in a cell (e.g., storage battery), and yet still maintain a final minimum polymer entanglement, can be approximated as follows:

$$[(W_{(ip)}/M_{(ip)}))+(W_{(w)}/M_{(w)})]/[W_{(ip)}/M_{(ip)}]=R_c$$

$$R_c=[M_{(ip)}/M_{(fp)}]$$

$$W_{(ip)}/W_{(w)}=M_{(ip)}/[18*(R_c-1)]$$

$R_c$=second polymer cleavage ratio
$W_{(ip)}$=initial total weight of the second polymer introduced into cell
$W_{(w)}$=total weight of water in cell
$M_{(m)}$=specific molecular weight of monomer
$M_{(ip)}$=average initial molecular weight of second polymer
$M_{(fp)}$=average final molecular weight of second polymer after hydrolysis cleavage, or the minimum entanglement molecular weight When the target $R_c$ is defined for a given second polymer, the amount of initial second polymer needed to limit over cleavage of water in a cell can be estimated. The approximate ratio of the initial second polymer weight to the initial weight of water [$W_{(ip)}/W_{(w)}$] is preferably at least 10:1, more preferably at least 50:1, even more preferably at least 100:1, and still even more preferably at least 500:1, with the ratio preferably maximizing at about 5,000:1. The minimum cleavage ratio, $R_c$, may be at least 1.1, but preferably is less than about 1,000.

When polyoxyethylene or polypropylene glycol is used as the second polymer, the initial molecular weight of polyoxyethylene or polypropylene glycol is preferably at least 110,000 Da, more preferably at least 310,000 Da, even more preferably at least 910,000 Da, and still even more preferably at least 2,100,000 Da. In virtually all cases, the use of a second polymer with a relatively high molecular weight is preferred; at the same time, in virtually all cases, the average initial molecular weight ratio of the second polymer to the first polymer may be below about 2:1, preferably below about 1:1, more preferably below about 0.5:1, and even more preferably below about 0.2:1, but preferably is above about 0.01:1. When polyamide and polyoxyethylene are used in a mixture, the weight ratio of polyamide to polyoxyethylene is preferably higher than about 0.1:1 and is preferably lower than about 10:1, more preferably lower than about 7:1, and even more preferably lower than about 3:1.

Since a polyamide is a product of a condensation or dehydration polymerization reaction, this reaction is reversible when water and acid, such as hydrofluoric acid, are present. More specifically, in the presence of acid and water, a polyamide may be converted back to its monomers and/or a lower molecular weight oligomer. Because of the aforementioned reaction of a polyamide with water, less water is available in a lithium cell containing $LiPF_6$ to react with the $LiPF_6$ to form unwanted products like lithium hydroxide, hydrogen gas, and hydrofluoric acid. As noted above, hydrofluoric acid may be responsible for the degradation and shortened lifetime of lithium ion batteries and other energy storage devices that use fluorine-containing organic electrolytes. Even small amounts of residual moisture (introduced during battery production) can result in the formation of highly corrosive hydrofluoric acid inside such battery cells. This can affect the electrolyte chemistry, leading to lower performance, failure of the device, or, in the worst case, outgassing and leakage of the electrolyte. The hydration of the second polymer produces functional groups of amine, alcohol and carboxylic acid, and lowers the molecular weight of the second polymer. The hydration of polyoxythylene would produce functional end groups of diol. When the hydroxyl group of water cleaves a condensation polymer in accordance with the present invention, the resultant functional groups tend to improve wettability of the separator and electrolyte retention and, thus, tend to improve cell cycle life.

A separator with a high second polymer concentration relative to that of a first polymer often will disintegrate and breakdown in a lithium-based cell, causing dendrite shorts. The second polymer preferably constitutes about 0.1 to 20 weight percent of the initial extrusion mixture, with about 1 to 15 weight percent being more preferred and about 2.1 to 9.9 weight percent being even more preferred. The initial weight ratio of the second polymer to the first polymer is preferably about 0.01:1 to 1:1, more preferably about 0.02:1 to 0.5:1, even more preferably about 0.05:1 to 0.3:1, and still even more preferably about 0.1:1 to 0.2:1. Due to the potential hydrolysis reaction of the second polymer in a lithium battery, it is preferable that the second polymer form the discontinuous phase of the microporous sheet product and that the first polymer form the continuous porous network of the microporous sheet product, with the first polymer preferably forming connecting fibrils making up the continuous porous network.

Due to the scavenging action of the second polymer for water, which scavenging action may be utilized, for example, when the microporous sheet product is employed as a battery separator within a lithium-based cell, a benefit of the second polymer may be best demonstrated when greater than about 10 ppm of water is available, more so when greater than about 40 ppm of water is available, even more so when greater than 150 ppm of water is available. Invariably, there may be moisture ingress into a lithium-based cell during cell cycle life. However, too much moisture within a battery separator also defeats the purpose of the scavenging polymer, especially in a high relative humidity cell assembly environment. Accordingly, the separator may need to be dried, as some of these condensation polymers are hygroscopic, for example, by heating or vacuuming, prior to the addition of a lithium electrolyte. The moisture in the separator preferably is below about 1% or 10,000 ppm, more preferably below about 2000 ppm, even more preferably below about 900 ppm, and still even more preferably below about 300 ppm. Prior to cell assembly, the separator may be best packaged in hermetically sealed packaging, such as a foil bag and in vacuumed packaging.

The compatibilizing agent (also sometimes referred to herein as a "first fluid") may be included in the extrusion mixture to promote the formation of the initial sheet material. The first fluid may be selected from organic fluids that are capable of providing at least minor solubility with respect to the first and second polymers. Thus, the first fluid may act as a sufficient solvent with respect to the first and second polymers to allow the first and second polymers and the first fluid to form a uniform mixture having fluidity at elevated temperatures (e.g., about 100 to 250° C.) so that an initial sheet material may be formed therewith. The first fluid may comprise one or more hydrocarbon oils, such as mineral oil, or may comprise one or more organic esters or phthalates. Preferably, the first fluid is selected from low molecular weight, high vapor pressure organic liquids, such as mineral spirits, lower molecular weight alkanes, $C_9$ to $C_{20}$ aliphatic, alicyclic or aromatic hydrocarbons, such as nonane, decane, p-xylene, undecane, dodecane, and octadecane to icosane, and the like, as well as mixtures thereof. The first fluid preferably has a high vapor pressure, for example, of about 1 to 50 mm Hg at 70° C. (e.g., about 1 to 5 mm Hg at 70° C., about 5 to 10 mm Hg at 70° C., about 10 to 20 mm Hg at 70° C., about 20 to 40 mm Hg at 70° C.) and preferably has a vapor pressure of about 0.1 to 5 mm Hg at 20° C. The first fluid preferably has a boiling temperature of about 135 to 300° C. (about 275 to 572° F.), with boiling temperatures of about 170 to 250° C. (about 338 to 482° F.) being particularly preferred. A preferred first fluid comprises a mixture of fluids having a boiling range (initial to final boiling points) of at least 10° C. in breadth, more preferably at least 15° C. in breadth, even more preferably at least 20° C. in breadth, thereby enhancing the ability to provide controlled multiple temperatures and multiple steps of solvent evaporation. In certain product applications, a low volatility hydrocarbon or mineral oils may be used. Preferably, the first fluid constitutes about 20 to 85 weight percent of the extrusion mixture, more preferably about 30 to 80 weight percent of the extrusion mixture, and even more preferably about 40 to 75 weight percent of the extrusion mixture.

In order to promote a uniformity of melt between the first and second polymers, particularly in cases where the first polymer is a polyolefin, the second polymer preferably has a $T_m$ (melt temperature) below about 240° C., more preferably below about 200° C., and even more preferably below about 160° C. When a sheet material comprising the first and second polymers exits an extrusion die, the second polymer preferably crystallizes before the first polymer, forming crystallization seeds and encouraging an overall polymer matrix crystallization and formation. In a preferred embodiment, an extrusion mixture comprising the first polymer and the second polymer may be melt-extruded to form a molten sheet. The molten sheet may then be exposed to an above-UEL vapor zone (which is discussed further below) to accelerate the first polymer crystallization by seeding of the second polymer. Additionally, the second polymer and the UEL fluid vapor preferably have a solubility parameter difference of greater than 1, more preferably greater than 2. Solubility parameters of various components that may be present in connection with the present invention are listed below (in units of $cal^{1/2}/cm^{3/2}$):

| Material ID | Solubility Parameter |
|---|---|
| mineral spirits | 6.9 |
| mineral oil | 8.6 |
| water | 23.4 |
| Polyethylene | 7.9 |
| Polyacetal | 11.1 |
| Polyamide 6 | 12.8 |
| Polyamide 8 | 12.3 |
| Polyamide 6/6 | 13.6 |
| Polyethylene oxide PEO | 9-12 |
| Polypropylene oxide | 7.7 to 10.1 |
| Polyphenylene oxide | 9.1 |
| Polyethylene terephthalate | 10.7 |
| Polyvinyl alcohol | 15.2 |
| Polyacrylonitrile | 15.4 |
| Polyurethane | 8.9 |
| Polycarbonate | 9.8 |
| Polysulfone | 10.6 |

The microporous sheet product of the present invention may consist of a single layer of any of the types described in this document or may comprise a plurality of stacked or laminated layers, one or more of which may be of any of the types described in this document. A laminate structure may be readily formed using conventional multi-sheet extrusion head devices (e.g. co-extrusion) or by laminating together, using heat, adhesives, or other means, two or more previously formed layers. Examples of multilayer structures are described in European Patent Application Publication No. EP 1 911 352 A1, published Apr. 16, 2008, which is incorporated herein by reference. One or more of the layers of a multilayer structure may be a protective layer. The materials used in the various layers should be sufficiently compatible and miscible to permit adhesion during extrusion and juxtaposition of the layers.

When a laminate structure is used as a battery separator in a lithium battery, a layer comprising the second polymer is preferably not in direct contact with the lithium positive electrode. When a laminate structure of three layers or more is used, a layer comprising the second polymer is preferably present only in an interior or core layer. For example, in a laminate structure of an ABA type, the outer or A layers may be devoid of the second polymer, and the core or B layer may comprise a matrix of the first polymer (which may be a polyolefin) and the second polymer. On the other hand, when each layer of a laminate structure comprises the second polymer, the core or interior layers preferably have a higher second polymer to first polymer ratio than do the outer layers, this ratio being at least 1.5 times higher in the core or interior layers than in the outer layers, more preferably 3 times higher in the core or interior layers than in the outer layers, and even more preferably 5 times higher in the core or interior layers than in the outer layers. The layers having lower amounts of the second polymer may tend to provide strength to the laminate structure, and the layers having greater amounts of the second polymer may tend to have a larger pore size and a higher porosity in the laminate structure.

In a laminate co-extruded structure of the present invention, some or all of the layers of the structure may be prepared using an extrusion mixture comprising a different fluid percentage. For example, surface or outer layers of a structure may have a higher fluid percentage than a center or core layer, and this higher fluid percentage may be at least 2 percent higher, more preferably at least 4 percent higher, even more preferably at least 7 percent higher, and still even more preferably at least 11 percent higher. A higher surface fluid percentage may accelerate extrusion phase separation on cooling and may enable larger pore size and higher porosity in the structure surface layer.

In a laminate co-extruded structure of the present invention, some or all of the layers of the structure may be prepared using an extrusion mixture having a different polymer average molecular weight. For example, the surface layer may have a lower polymer average molecular weight than the core layer, and this lower polymer average molecular weight may be at least 10,000 Da lower than that of the core layer, preferably at least 20,000 Da lower than that of the core layer, more preferably at least 50,000 Da lower than that of the core layer, and even more preferably at least 100,000 Da lower than that of the core layer. A lower average molecular weight of the polymer mixture may accelerate extrusion phase separation on cooling and may enable a larger pore size and a higher porosity in the structure surface skin layer.

Certain applications may benefit from or may require a polymer coating solution applied to the separator or electrode, in which low crystalline polymers, such as cyclic olefin, styrene, butylenes and isobutylene, may be incorporated. The polymeric composition may further contain fillers, colorants, anti-oxidants, stabilizers and the like. Although solid particulate materials are not a desired component of the initial polymeric composition forming the sheet material and the resultant sheet product, when present they should be limited to less than about 20 weight percent, preferably less than about 5 weight percent, of the polymeric composition used in forming the initial polymeric sheet material, as described herein. The remainder of the description of the present invention may be illustrated by the use of polyolefins to form the present sheet product and separators therefrom.

Use of Microporous Sheet Product as Battery Separator

Referring now to FIG. 1, there is shown a schematic section view of one embodiment of an electrochemical cell constructed according to the teachings of the present invention, the electrochemical cell being represented generally by reference numeral 11. For clarity, simplicity, and/or ease of illustration, certain details of electrochemical cell 11 that are discussed elsewhere in this application or that are not critical to an understanding of the invention may be omitted from the present specification and/or may be omitted from FIG. 1 or may be shown therein in a simplified manner.

Electrochemical cell 11, which may be a battery cell and preferably is a lithium-ion battery cell, may comprise an anode 13, a cathode 15, an electrolyte 17, a separator 19, and a housing 21.

Anode 13, which may be, for example, an anode of the type conventionally found in a lithium-ion battery cell, may comprise an electrode consisting of or comprising carbon (e.g., graphite).

Cathode 15, which may be, for example, a cathode of the type conventionally found in a lithium-ion battery cell, may comprise an electrode consisting of or comprising a metal oxide, such as $LiCoO_2$ or $LiMn_2O_4$.

Electrolyte 17, which may be, for example, an electrolyte of the type conventionally found in a lithium-ion battery cell, may comprise one or more liquid organic solvents with one or more lithium salts dissolved therein. The one or more liquid organic solvents may comprise one or more organic carbonates, such as ethylene carbonate and diethyl carbonate. The lithium salt may comprise lithium hexafluorophosphate ($LiPF_6$).

Separator 19 may be a microporous sheet product of the type described above that includes a condensation polymer.

Housing 21 may be, for example, a housing of the type conventionally found in a lithium-ion battery cell and is preferably constructed to contain anode 13, cathode 15, electrolyte 17, and separator 19. Housing 21 preferably is constructed in such a way as to be substantially impermeable to the ingress or egress of water.

As discussed above, the presence of water in electrochemical cell 11 can lead to the generation of some potentially undesirable substances. Therefore, the presence of water in electrochemical cell 11 is generally regarded as not being desirable. Nonetheless, despite the fact that the presence of water in electrochemical cell 11 is generally undesirable, some water may be present in electrochemical cell 11. Such water may become present in electrochemical cell 11, for example, during cell assembly or may become entrapped in one or more of the components of electrochemical cell 11. Fortunately, due to the presence of the condensation polymer in separator 19, which condensation polymer may serve to scavenge water from the cell, the potentially harmful effects of such water may be minimized. On the other hand, it would be undesirable for too much of the condensation polymer to depolymerize, due to its reaction with water, as excessive depolymerization may cause the condensation polymer to leach out of or migrate from separator 19, potentially causing significant changes to the physical (or other) properties of separator 19. According to the present invention, $W_{ip}/W_w$ (i.e., the ratio of the initial total weight of the condensation polymer that is present in electrochemical cell 11 to the initial total weight of water that is present in electrochemical cell 11 (the aforementioned initial total weight of water preferably referring to the amount of water present in electrochemical cell 11 immediately after any drying steps, such as vacuum drying, have been performed at or around the time of cell manufacture), is preferably at least 10:1, more preferably at least 50:1, even more preferably at least 100:1, and still even more preferably at least 500:1, with the ratio preferably maximizing at about 5,000:1. As noted above, the initial total weight of water that is present in electrochemical cell 11 may be greater than 10 ppm and even may be greater than 40 ppm. Viewed alternatively, the condensation polymer cleavage ratio, $R_c$ (i.e., the ratio of the average initial molecular weight of the condensation polymer to the average final molecular weight of the condensation polymer after hydrolysis (or its minimum entanglement molecular weight)), is preferably at least 1.1, but preferably less than about 1,000.

It is to be understood that, although FIG. 1 shows a single electrochemical cell 11, a plurality of electrochemical cells 11 may be electrically connected to one another and contained within a common housing to form a multi-cell battery.

It is also to be understood that, although electrochemical cell 11 is described herein as preferably being a lithium-ion cell, electrochemical cell 11 is not limited to being a lithium-ion cell and may be any type of lithium-based electrochemical cell.

Process Specifications

According to another aspect of the invention, there is provided a novel method for manufacturing a microporous sheet product. In one embodiment, the manufacturing method may comprise the steps of (i) melt-extruding an extrusion mixture to form a cast sheet; (ii) cooling the cast sheet in a first gas zone, the first gas zone comprising a vapor of an organic fluid, the vapor present within at least a portion of the first gas zone being at an above-UEL concentration; and (iii) performing at least some stretching of the cooled cast sheet in a second gas zone, wherein the vapor of the organic fluid is at a below-LEL concentration in the second gas zone.

More specifically, in at least some embodiments of the invention, the first polymer, the first fluid, and, optionally, the second polymer may be mixed together to form a substantially uniform composition. The mixing may be done prior to or as part of the formation of the first shaped material, such as by feeding the polymer(s) and fluid into a single or twin screw feed chamber of an extruder. Such extruders are well known and are exemplified in the following documents, all of which are incorporated herein by reference: U.S. Pat. No. 7,887,727 B2, inventors Lee et al., issued Feb. 15, 2011; U.S. Patent Application Publication No. US 2011/0133355 A1, inventors Takita et al., published Jun. 9, 2011; U.S. Patent Application Publication No. US 2010/0041779 A1, inventors Lee et al., published Feb. 18, 2010; U.S. Patent Application Publication No. US 2007/0138682 A1, inventors Lee et al., published Jun. 21, 2007; PCT International Publication No. WO 2009/51278 A2, published Apr. 23, 2009; PCT International Publication No. WO 2007/46496 A1, published Apr. 23, 2009; PCT International Publication No. WO 2007/73019 A1, published Jun. 28, 2007; and PCT International Publication No. WO 2008/72906 A1, published Jun. 19, 2008.

Though not particularly critical, the uniform melt-blending of the polymer solution (wherein the first polymer may be, for example, a polyolefin) may be conducted in a double-screw or twin screw extruder. The first fluid may be added to the polymer(s) before melt-blending starts; alternatively, the first fluid may be supplied to the extruder in an intermediate step of the blending. Due to a potentially large solubility parameter difference between the first polymer and the second polymer (in those cases where the second polymer is present), the polymer blend may be pre-compounded. In other words, the first and second polymers may be melted together in a first extruder of a twin screw extruder or compounder before feeding the melted mixture to a second extruder of the twin screw extruder to produce a cast sheet. Nevertheless, in order to minimize the particle size of the second polymer and to achieve nanoparticle compounding, the extruder may have a length to screw diameter ratio (L/D), of at least 30:1, preferably at least 36:1, and more preferably at least 42:1. High total mechanical energy input is needed to melt, to molecularly interweave and to overcome the large solubility parameter difference between the first and second polymers in order to produce a homogeneous uniform cast sheet and sheet product. The extruder energy input may be added by increasing the extruder screw rpm and/or by adding kneading blocks. In so doing, the total melting energy input may be at least 0.15 kwh/kg, preferably at least 0.25 kwh/kg, more preferably at least 0.35 kwh/kg, and even more preferably at least 0.45 kwh/kg.

The mixture may be heated to a temperature which is higher than the melt temperature ($T_m$) of the polymer(s) as measured by conventional differential scanning calorimetry (DSC) while, at the same time, being below the boiling point temperature of the first fluid. Temperatures of about 100° C. to about 250° C. may be suitable for this purpose while subjecting the mixture to shear forces to cause the components to form a uniform mixture prior to being shaped (such as by extrusion through a die head) into the initial shaped sheet material. The polymer(s) may lose a majority, if not all, of its (their) crystallinity properties during this operation.

The formed mixture may be shaped into an initial sheet material (i.e., cast sheet) by any technique, such as by extrusion of the extrusion mixture through an extrusion die. Such forming of the initial sheet material may be conducted at an elevated temperature, such as those indicated above for the mixing of the fluid with the polymer(s). The initial sheet material may have a thickness that is sufficient to permit stretching to be performed without causing disintegration of the material. The proper thickness of the initial sheet material, which may be readily determined by a person of ordinary skill in the art, may be about 0.1 to 5 mm, preferably about 0.2 to 3 mm, and more preferably about 0.2 to 2 mm.

The initial sheet material may be cooled by passing the sheet from the die into a first gas zone. While in the first gas zone, the initial sheet material may be contacted with a medium on a chilled roll surface or in a cooling bath. As discussed further below, the gas present in the first gas zone may comprise an organic fluid vapor and may be predominately the vapor of the first fluid or the vapor of a second fluid. The composition of the second fluid and its vapor may be formed of at least 50 weight percent, preferably at least 70 weight percent, more preferably at least 90 weight percent, and even more preferably 100 weight percent, of the same fluid (i.e., the first fluid) used to form the extrusion mixture and contained in the initial sheet material. It is particularly preferred to have the first fluid and the second fluid to be of the same composition and also to be 100 weight percent of a single liquid in order to aid in handling and ease of allowing for recycling of the fluid, as described below. When the second fluid is made up of less than 100 weight percent of the first fluid, the remaining fluid is preferably chosen from one or more organic fluids that are miscible with the first fluid and that have boiling point, flash point, and vapor pressure properties within the same ranges indicated above for the first fluid. The fluid may be maintained at a temperature of up to about 100° C. or by maintaining the cooling roll surface below about 100° C. The initially shaped sheet material may reside in the fluid for a sufficient time to reduce the temperature of the sheet material below the melt temperature(s) of the polymer(s). The initially shaped sheet material may reside in the fluid for up to about 90 seconds, preferably from about 0.01 to 90 seconds, more preferably from about 0.7 to 50 seconds, and even more preferably from about 1 to 20 seconds. The time is preferably of sufficient duration to cool the initial shaped sheet material to below the $T_m$ of the polymer(s) used.

The first gas zone may be maintained at ambient temperature or at a temperature within the range of about −20 to 160° C. The first gas zone temperature is preferably below about 130° C., and more preferably below about 100° C. but preferably above about 30° C. The residence time within which the initial sheet material is present within the first gas zone may be short, such as about 0.01 to 20 seconds. The space defining the first gas zone may be covered or enclosed. In at least a portion of the first gas zone, a first organic vapor, which may comprise the vapor of the first fluid or the vapor of the second fluid, may be present at an above-UEL condition (i.e., concentration). For example, according to a first embodiment, the first organic vapor may be present at an above-UEL condition throughout the entirety of the first gas zone. In other words, according to the first embodiment, the first organic vapor may be present at an above-UEL condition at all locations within the first gas zone. This may be the case even where the concentration of the first organic vapor is not constant from location to location within the first gas zone. Alternatively, according to a second embodiment, the first organic vapor may be present at an above-UEL condition at one or more locations within the first gas zone but need not be present at an above-UEL condition at every location within the first gas zone. For example, the first organic vapor may be at an above-UEL condition at one or more locations within the first gas zone, and the first organic vapor may not be at an above-UEL condition at one or more other locations within the first gas zone. Moreover, there may be some variation in concentration from location to location in those locations within the first gas zone in which the first organic vapor is at an above-UEL condition and/or there may be some variation in concentration from location to location in those locations within the first gas zone in which the first organic vapor is not at an above-UEL condition. In some instances, but not all instances, of the aforementioned second embodiment, the mean concentration of the first organic vapor for the entirety of the first gas zone may be at an above-UEL condition, with some locations of the first gas zone being at an above-UEL condition and other locations of the first gas zone not being at an above-UEL condition. In some instances, but not all instances, of the aforementioned second embodiment, the first organic vapor may be at an above-UEL condition at some or all of the locations within the first gas zone through which the sheet material passes (with some of the remaining locations not being at an above-UEL condition for the first organic vapor). For example, the first organic vapor may be present at an above-UEL condition at all locations within the first gas zone through which the sheet material passes, such as the path beginning at the entrance of the enclosure defining the first gas zone, extending to any chilled rolls within the enclosure, and then terminating at the exit of the enclosure defining the first gas zone. In addition, the first organic vapor may also be present at an above-UEL condition at locations within the first gas zone that closely neighbor the aforementioned path. As another example, the first organic vapor may be present at an above-UEL condition for only one or more portions of the aforementioned path, such as the portion of the path beginning at or near the entrance of the enclosure and extending to, and perhaps including, the chilled rolls. In addition, the first organic vapor may also be present at an above-UEL condition at locations within the first gas zone that closely neighbor the aforementioned portion(s) of the path.

When a hydrocarbon vapor is used as the first organic vapor at an above-UEL condition in the first gas zone, the hydrocarbon vapor may be present in at least a portion of the first gas zone at a concentration of greater than about 3% by volume, preferably at a concentration of greater than about 7% by volume, more preferably at a concentration of greater than about 12% by volume, and even more preferably at a concentration of greater than about 20% by volume. As another example, when mineral spirits vapor is used as the first organic vapor at an above-UEL condition in the first gas zone, the mineral spirits vapor may be present in at least a portion of the first gas zone at a concentration of greater than about 5% by volume, preferably at a concentration of greater than about 6% by volume, more preferably at a concentration of greater than about 8% by volume, and even more preferably at a concentration of greater than about 11% by volume. Due to the design of the first gas zone enclosure, the first organic vapor build-up from the extrusion steady state may be insufficient to replace 100% of the atmospheric air, oxygen or water that may be present within the enclosure. As a result, the upper percentage of first organic vapor in the enclosure may be below about 60%, more likely below about 90%, and most likely below about 99%. Moreover, a 100% filling of first organic vapor by a secondary non-extrusion source may not be economically feasible.

The above-UEL condition of the first gas zone may maximize the compatibility of cooling, coagulation and phase separation of the cast sheet surfaces. In so doing, the first gas zone may ensure maximum open surface pores and uniformity of surface phase separation, similarly in compatibility and solubility parameter to the internal core of the sheet. The above-UEL condition of the first organic vapor in the first gas zone may also minimize the possibility of combustion within the first gas zone. An above-UEL condition may be created by introducing the first organic vapor or reducing air flow within the first gas zone enclosure to allow the first organic vapor to build up from extrusion. The first gas zone enclosure may be electrically grounded. To further improve safety, the above-UEL condition of the first gas zone may be attained using an inert gas, such as nitrogen or carbon dioxide, and the concentration of oxygen may be reduced below the normal atmospheric of 21% by volume. Oxygen vapor concentration in an above-UEL gas zone or in a below-LEL gas zone is preferably below about 20%, more preferably below about 16%, even more preferably below about 14%, still even more preferably below 12%. At and below 14% oxygen concentration, a gas zone may be regarded as being below the Limiting Oxygen Concentration (or LOC), since a fuel, such as the first organic vapor, irrespective of its concentration, is not flammable below LOC. Consequently, when the first gas zone is below LOC, it may be deemed as equivalent to and/or subsumed within an above-UEL condition. The ratio of the first organic vapor to oxygen in an above-UEL gas zone or in a below-LEL gas zone is preferably greater than about 0.1:1, more preferably greater than about 0.5:1, even more preferably greater than about 1:1, and still even more preferably greater than about 2:1.

As the melt mixture exits the die, the first fluid vapor may vaporize from the cast sheet due to the transition from the extruder pressure (which is comparatively high) to ambient pressure (which is comparatively low). The vaporization of the first fluid from the cast sheet may help to create, supply, build and maintain an above-UEL organic fluid vapor condition when the cast sheet and the cast roll environment are properly enclosed and contained. The enclosure may contain sections of supercooled vapor. To ensure organic fluid vapor build-up from a steady-state of extrusion, the cast sheet entrance and exit may be specifically designed to limit organic fluid vapor egress or air ingress, such as by having an opening gap of less than about 50 mm between the cast sheet and the enclosure so as to limit the rate of ambient air entering the enclosure preferably to less than about 0.1 $m^3$/min, more preferably less than about 0.001 $m^3$/min. In all cases, the potential air ingress volume is to be less than the potential vapor volume generated by the vaporization of the first fluid from extrusion.

In a preferred embodiment, the organic fluid vapor of the first gas zone may have a solubility parameter equal to the first fluid or within one solubility parameter unit of the first fluid. This above-UEL condition tends to produce a more compatible and uniform open surface porous cast film. By comparison, if the cast sheet is formed below the UEL condition, the sheet product surfaces tend to be less uniform and tend to have randomly crystallized polymer patches. By cooling the cast sheet in an above-UEL zone, the first fluid vapor may be allowed to cool after extrusion. Preferably, the vapor zone is maintained between about 30 and 200° C. below the boiling point of the first fluid, causing the extrusion fluid vapor to preferentially supersaturate and condensate onto the surface of the chilled roll. The first fluid may become supersaturated at a given temperature and may deposit onto the cooling roll surface. This cooled surface fluid may improve thermal conductivity between the cast sheet and the cast roll and may accelerate phase separation to achieve open pore network formation, and, thus, may increase separator conductivity and reduce pore matrix tortuosity. The preferred thermal conductivity may be above 0.05 W/m-K. The typical coefficient of thermal conductivity of air to the cooling roll surface, wherein the cooling roll is made of steel, may be 0.024 W/m-K, whereas the organic cooling fluid may improve the coefficient to 0.137 W/m-K, and water can be 0.548 W/m-K. Higher thermal conductivity is preferred; however, water has a large solubility parameter difference to that of the cast sheet fluid and, thus, may create a non-porous skin layer on the cast sheet.

In some types of cast sheet cooling configurations, such as an S-wrap cast configuration (seen in FIGS. 2 and 3, which are discussed further below), two chilled rolls may exhibit a micro layer of condensed fluid on the roll surface. In addition, in an S-wrap cast configuration, the two chilled rolls preferably do not touch one another in order to prevent compression of the cast sheet surface. The gap between the two rolls may be at least 50 microns, preferably at least 200 microns, and more preferably at least 1,000 microns but less than about 20 mm. When the cast sheet is exposed to the fluid vapor in an above-UEL condition, the skin layer thickness may be below about 20 microns, preferably below about 10 microns, more preferably below about 7 microns, and even more preferably below about 4 microns.

The initially formed shaped sheet material, as it is produced by the extruder or other shaping device, may comprise the polymer(s) and fluid, and this sheet material may be substantially amorphous although it may still retain a residual degree of the original crystallinity of the polymer feed. Upon cooling of the initial sheet material, some polymer re-crystallization may occur. Thus, the cooled initial sheet material may exhibit polymer crystallinity of up to about 30 percent by mass, but more commonly less than 20 percent by mass, for example, less than 10 percent by mass.

The cast sheet, upon passing through the first gas zone, may contact at least one cooling surface, preferably two cooling surfaces, to further cool both cast sheet surfaces. For example, in an S-wrap cast configuration, the first cast sheet surface may be cooled by a first roll surface, and the second cast sheet surface may be cooled by a second roll surface. By contrast, in a U-wrap cast configuration (seen in FIG. 4, which is discussed further below), cooling of only one side of the cast sheet surface is typically achieved; consequently, the U-wrap cast configuration may produce less cooling efficiency. When an S-wrap cast configuration is used, the first roll is preferably equal to or smaller in roll diameter than the second roll to induce a shorter first surface cooling residence time. For example, the ratio of the diameter of the first roll to the diameter of the second roll may be less than 0.9:1, preferably less than 0.75:1, more preferably less than 0.5:1, and even more preferably less than 0.33:1. The cast sheet may contact the first roll anywhere along the first half of the S-shaped path in the S-wrap cast configuration before the web transfer inflection point (i.e., the point where the cast sheet is transferred from the first roll to the second roll). The cast sheet may exit or release from the second roll anywhere along the second half of the S-shaped path after the inflection point. When two cooling rolls are used, the cast sheet preferably has a shorter residence time on the first cooling roll than on the second cooling roll. For example, the residence time on the first cooling roll may be shorter than the residence time on the second cooling roll by at least 10%, preferably by at least 25%, more preferably by at least 50%, and even more preferably by at least 70%.

Figure 5:
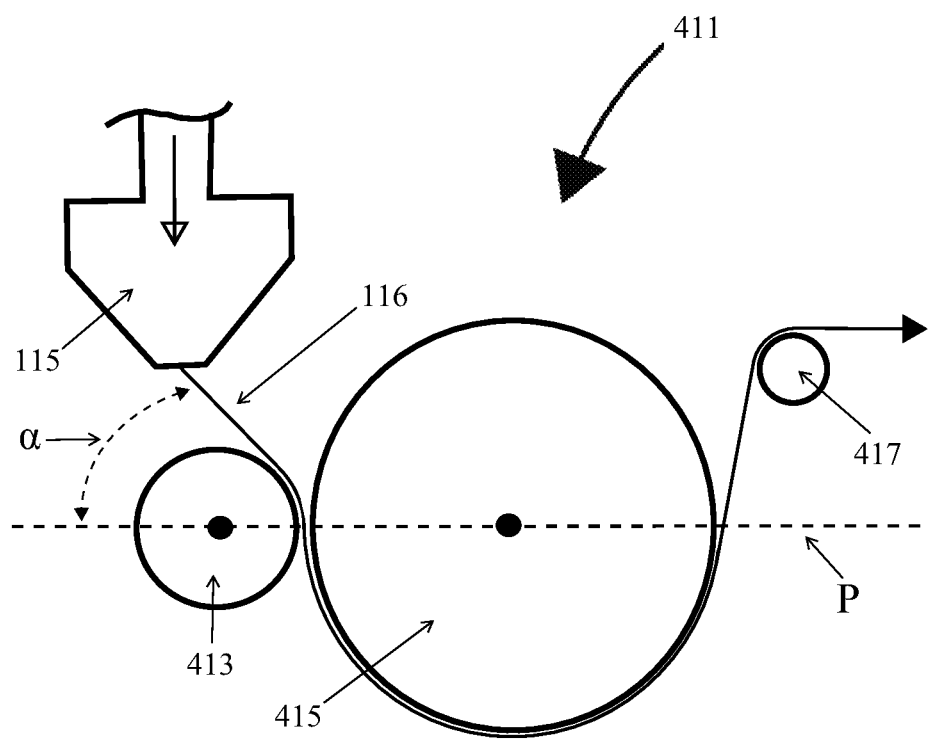
FIG. 5 is a schematic side view of a third alternate cast configuration to that shown in FIG. 2.

As illustrated in FIG. 5, when the two cast rolls are aligned in an imaginary plane P, a specific cast sheet entrance angle α, measured from the die melt exit to the plane P, may be between 20 and 85 degrees, more preferably between 30 and 80 degrees, and even more preferably between 45 and 80 degrees. Below 20 degrees, the second surface of the cast sheet may be slow to cool. Above 85 degrees, there may be insufficient cooling of the first surface, which may create sheet instability upon transfer of the sheet from the first roll to the second roll.

The first fluid vapor from the first gas zone may condense onto the cooling roll surfaces, forming a skin layer of condensate of fluid on the cooling roll surfaces. The cast sheet may then contact this skin layer on the cooling roll surfaces. Such a liquid skin layer on the cooling roll surfaces may be desirable since this skin layer may improve the thermal conductivity in the cooling of the cast sheet. The roll(s) may be maintained at a temperature between about −20° C. and $T_m$−20° C., more preferably between about 30° C. and $T_m$−40° C., and even more preferably between about 50° C. and $T_m$−50° C. Where the first polymer is polyethylene, the temperature of the cooling roll(s) is(are) preferably between about 50° C. and 90° C. Too low of a cooling temperature may undesirably slow down the phase separation within the sheet whereas too high of a cooling temperature may not allow the vapor of from the first gas zone to condense onto the cooling roll surfaces.

Water may interfere with the phase separation of the polymer mixture. Consequently, the roll temperature may be maintained at a temperature to limit the condensation of water vapor thereon. The desirability of limiting water condensation may be particularly great during times when high relative humidity is commonly experienced, such as during the summer. The enclosure of the first gas zone also may serve to limit water vapor ingress thereinto. Within the first gas zone, water vapor is preferably below about 30,000 ppm (70% RH at 38° C.), more preferably below about 21,000 ppm, even more preferably below about 8,000 ppm, and still even more preferably below about 3,000 ppm. The fluid condensate may cover at least 90% of the cast sheet contact surface, preferably at least 98% of the cast sheet contact surface, and more preferably at least 99.9% of the cast sheet contact surface. The fluid condensate preferably has a thickness on the cooling roll(s) of at least 0.01 micron, more preferably at least 0.11 micron, even more preferably at least 2 microns, and still even more preferably at least 11 microns but less than about 1 mm. A wiper blade may be used to distribute the fluid on the roll surface. The second fluid, if different from the first fluid, may be substantially soluble in the first fluid within a few solubility parameter units. The fluid between the cast roll and the cast sheet may be a vaporizable hydrocarbon. Such a vaporizable hydrocarbon may be an aliphatic hydrocarbon, which may be a C6 to C30 vaporizable hydrocarbon, more preferably a C8 to C20 vaporizable hydrocarbon. Due to compressive contact between the cast sheet and the cast roll, there may be an accumulation or build-up of cooling fluid, i.e., a fluid cooling bank. This fluid cooling bank, which may be deposited on the roll perimeter in the roll rotation direction of the sheet, may be at least 0.5 mm in length, preferably at least 1.1 mm in length, and more preferably at least 2.1 mm in length. The thickness of the fluid cooling bank between the roll and the sheet may be at least 10% thicker than the fluid condensate described above, or at least 0.01 mm, and is preferably at least 0.11 mm but less than about 2 mm.

The shaped sheet material, upon cooling in the manner described above, next travels from the above-UEL environment in the first gas zone to a below-LEL environment or condition in a second gas zone. In general, when using a hydrocarbon as the organic fluid, the hydrocarbon vapor in the below-LEL condition may be less than about 2% by volume, preferably less than about 1.5% by volume, and more preferably less than about 0.9% by volume. As a more specific example, when using mineral spirits as the organic fluid, the mineral spirits vapor in the below-LEL condition may be less than about 0.7%, preferably less than about 0.6%, and more preferably less than about 0.5%. The below-LEL condition can be achieved by providing sufficient air flow and fluid vapor removal within an enclosure.

Next, the cast sheet may be subjected to a two-step stretching/fluid vaporization process. In a first step, the cooled, shaped sheet material may be stretched in at least one direction. This first direction of stretching may be conducted in a machine direction, i.e., the direction from which the initial shaped sheet material exits the extrusion die head and the cooling roll(s). The stretching can be readily accomplished, for example, by passing the shaped sheet material through nip rollers of a set rotation rate and then through a second set or subsequent sets of nip rollers prior to a take-up roller. This first machine direction stretch may be performed in a below-LEL environment or in an above-UEL environment similar to that described above. Conventional stretching techniques may be used, such as a tenter method, an inflation method, or a combination thereof. The stretching may be conducted monoaxially or biaxially (machine and transverse directions), though monoaxial stretching may be preferred. In the case of biaxial stretching, any of simultaneous biaxial stretching, sequential stretching or multi-stage stretching (for instance, a combination of simultaneous biaxial stretching and sequential monoaxial stretching) may be used.

The initial shaped sheet material may be first stretched at least about 2 fold of its initial dimension in a first direction (e.g., machine direction), with stretching of about 2 to 12 fold being preferred and with stretching of about 3 to 8 fold being more preferred. This first stretching may be done while maintaining the sheet material at an elevated temperature. The temperature may be a temperature of $(T_m-70)$ to $(T_m-20)°$ C., where $T_m$ is the melt temperature of the polymer (where only one polymer is used to make the sheet material) or the higher $T_m$ of two or more polymers forming a mixture of polymers used to form the sheet material. The stretching preferably is sufficient to cause a reestablishing of crystallinity to the polymer of the first stretched sheet material.

During the first step of the two-step stretching/fluid vaporization process, residual fluid present in the sheet material may be removed by vaporization and recrystallization. The polymer of the resultant first stretched sheet material preferably has a degree of crystallinity of at least 40% by mass, more preferably about 40 to 85% by mass, and even more preferably about 50 to 80% by mass. Further, the residual fluid in the initially stretched sheet material preferably is present at about 10 to 50 weight percent of the initial shaped sheet material, more preferably at about 15 to 40 weight percent of the initial shaped sheet material. The first stretched sheet material may have an intermediate percent fluid to percent polymer crystallinity ratio of about 0.15:1 to 1:1.

The first stretched sheet material may subsequently be subjected to a second stretching/vaporization step. This second step may be conducted by stretching the first sheet material in at least one second direction which is transverse to the direction of the first stretching. For example, when only machine direction is used for the first stretching, the sheet material may be stretched in a direction transverse thereto for the second stretching. The stretching may be accomplished using a conventional tenter machine. The tenter may have a set of tracks which are able to grip the sheet product on both edges and pull the sheet farther apart as the sheet moves through the tenter. The second stretching may be done in the machine and/or transverse directions and may be accomplished either simultaneously with or sequential to directional stretching. The second stretching may be conducted at a temperature that is at least about 10° C. lower than the operating temperature of the first stretching step. The second stretching of the sheet material may be in one or both directions and may be from about 2 to 14 fold (i.e., about 200-1400%) of the initial dimension of the first stretched sheet material.

The second step of the stretching/fluid vaporization process may also concurrently include further vaporization and removal of fluid remaining in the sheet material. Upon completion of the stretching of the sheet material, the sheet material preferably is substantially free of or has only low amounts of residual fluid.

The sheet material may utilize first and second (e.g., machine and transverse) stretches to produce a sheet product. The combined stretches ratio may be at least about 4 fold, with about 4 to 140 fold being preferred, and with about 8 to 80 fold being more preferred. Depending on the machinery set-up, the first and second stretches may be interchangeable when processed in sequence.

With the second stretched sheet material under tension in at least one or both stretched directions, the second stretched sheet material may be subjected to annealing, or elevated temperature sheet stabilization. The annealing temperature may be about $(T_m-50)$ to $(T_m-5)°$ C. wherein $T_m$ represents the melting temperature of the first polymer of the sheet product. The completeness of annealing may be a function of heat transfer effectiveness, temperature, residence time, and relaxation. The stretched sheet material may be maintained under these conditions for a period of time of about 1 to 300 seconds, preferably about 5 to 120 seconds. Optionally, the sheet product may be relaxed in one or both stretched directions (length and/or width of about 5% to 20% reduction) as known in the art to further improve dimensional stability. This approach anneals the sheet material to set the polymer in a fixed configuration to form the desired sheet product. The annealed sheet product may be further stored at room temperature or in a hot box environment for up to two weeks to complete dimensional stabilization.

Upon completion of the stretching of the sheet material, the residual fluid in the sheet may be removed by vaporization during and/or prior to annealing. The residual amount of fluid may be substantially 0% by weight of the sheet product, or less than 1 percent by weight of the sheet product. The sheet product preferably has any second polymer uniformly distributed within the first polymer matrix network and preferably possesses continuous open-cell capillary pores. The second polymer may be in fibril or particle form and may have a particle size of less than 1 micron, preferably less than 900 Å, more preferably less than 400 Å, and even more preferably less than 90 Å.

Preferably, some or all of the above operations of mixing the polymer(s) and fluid, cooling the sheet material, stretching the sheet material in one or both directions, and annealing may be performed in one or more enclosures to readily permit capturing of any vaporized fluid. The captured vapors may be then subjected to condensation, collection or recycling for use as the first fluid or may be used as a fuel for the heating of stretching rollers, a tenter or an annealing oven.

Finally, by using a low molecular organic fluid of high vapor pressure and low boiling point, as described herein, and by removing said fluid by vaporization of the fluid from the sheet material to ultimately form the resultant sheet product, one may be to obtain the desired sheet product while reusing the fluid. As a result, the waste stream, common with other known methods where an initial fluid is removed by extraction with a second fluid, may be reduced or eliminated by the present process, thereby providing both environmental and economic benefits.

Figure 2:
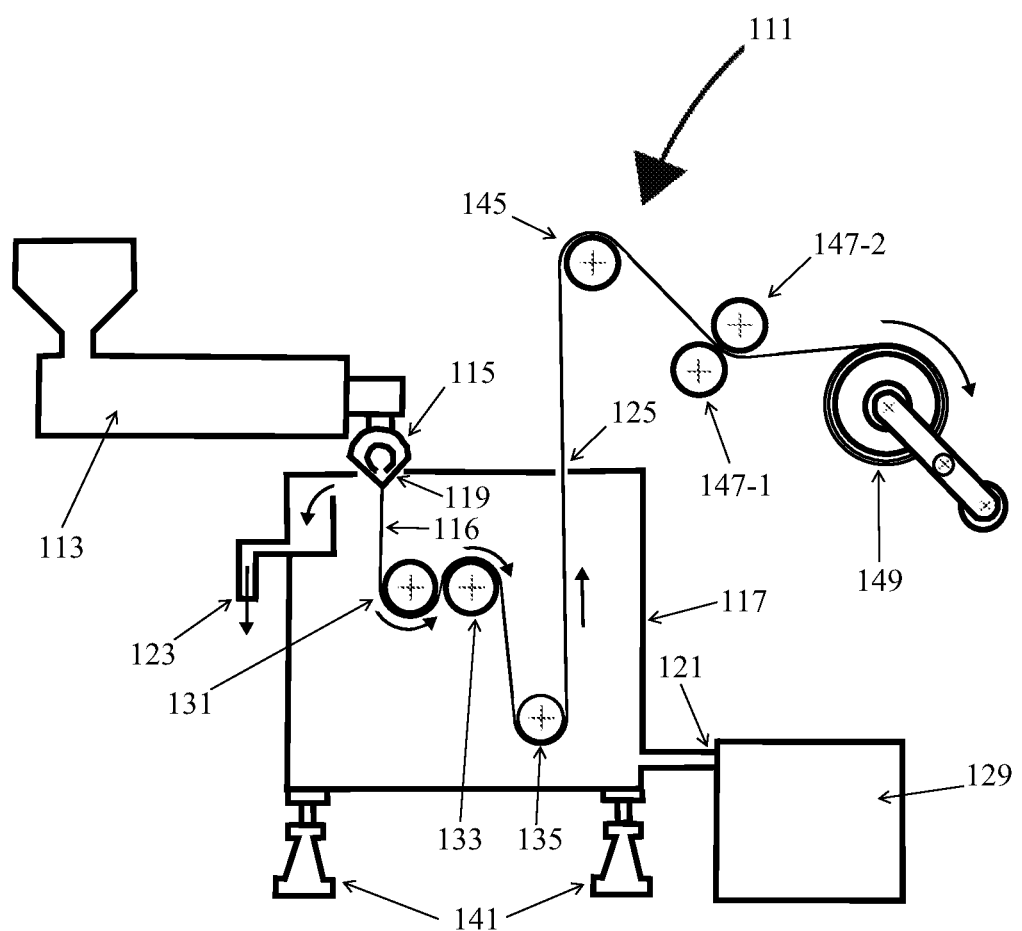
FIG. 2 is a schematic side view of one embodiment of a system for making a microporous sheet product according to the present invention, the system comprising an S-wrap cast configuration.

Referring now to FIG. 2, there is shown a simplified schematic side view of one embodiment of a system for manufacturing a microporous sheet product in accordance with the present invention, the system being represented generally by reference numeral 111. For clarity, simplicity, and/or ease of illustration, certain details of system 111 that are discussed elsewhere in this application or that are not critical to an understanding of the invention may be omitted from the present specification and/or may be omitted from FIG. 2 or may be shown therein in a simplified manner.

System 111 may comprise an extruder 113, which may be conventional and/or of the type described above. A die head 115, which may be conventional and/or of the type described above, may be coupled to an outlet end of extruder 113. An extrudate or cast sheet 116 may be emitted from die head 115.

System 111 may further comprise an enclosure 117. Enclosure 117, which may be made of a substantially gas-impermeable material, may be shaped to comprise a first inlet 119, a second inlet 121, a first outlet 123, and a second outlet 125. First inlet 119 may be appropriately positioned and dimensioned to receive an outlet end of die head 115 so that cast sheet 116 may be introduced into enclosure 117. Second inlet 121 may be fluidly coupled to an outlet end of an inert gas source or purge 129, which may be used at process start-up or as needed to reduce the oxygen concentration within enclosure 117. Examples of inert gases that may be present within purge 129 may include nitrogen gas or carbon dioxide gas. First outlet 123 may be appropriately positioned and dimensioned to permit overflow gas to escape from within enclosure 117.

The interior of enclosure 117 may contain a first gas zone, and the vapor of an organic fluid, such as, but not limited to, the vapor of the first fluid from cast sheet 116 may be allowed to build up within the first gas zone to a concentration that is above the Upper Explosive Limit. Depending on the size of enclosure 117 and/or its design, the vapor concentration of the organic fluid may be extremely high at the first inlet 119 and/or sheet 116 locations, but certain static location(s) within, such as first outlet 123 and second outlet 125, may exhibit much lower vapor concentration(s) due to vapor egress and/or air ingress. As noted above, in some cases, such lower vapor concentrations may be less than an above-UEL condition.

Enclosure 117 may be appropriately dimensioned to receive a plurality of rolls. Such a plurality of rolls may include, for example, a first roll 131, a second roll 133, and a third roll 135. First roll 131, which may be a chilled roll, and second roll 133, which may be a chilled roll, may be collectively arranged within enclosure 117 in an S-wrap cast configuration, with the take-up side of first roll 131 aligned with first inlet 119. Third roll 135 may have an exit side aligned with second outlet 125.

System 111 may further comprise one or more jacks 141, which may be used to elevate or otherwise adjust the level of enclosure 117.

System 111 may further comprise an idler roller 145, a pair of pull rollers 147-1 and 147-2, and a wind-up roller 149. Idler roller 145 may have a take-up side aligned with second outlet 125 so that it may receive the cooled cast sheet 116. Pull rollers 147-1 and 147-2 may be used to stretch the cooled cast sheet 116 in a two-step stretching process, and wind-up roller 149 may be used to store the product in a wound state.

The space outside enclosure 117, particularly the space encompassing idler roller 145, pull rollers 147-1 and 147-2, and wind-up roller 149, may define a second gas zone. Preferably, the concentration of organic fluid within the second gas zone is at a concentration that is below the Lower Explosive Limit.

It is to be understood that, although, in the present embodiment, the second gas zone is not housed within an enclosure, the second gas zone could be housed within an enclosure.

Figure 3:
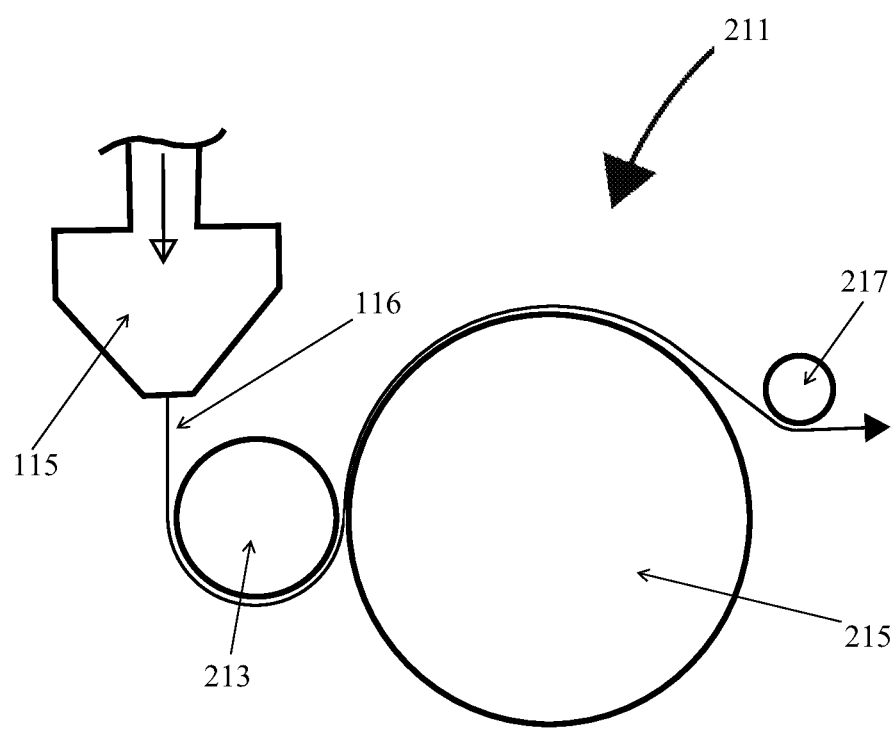
FIG. 3 is a schematic side view of a first alternate cast configuration to that shown in FIG. 2.

Referring now to FIG. 3, there is shown a schematic side view of a first alternate cast configuration to that shown in system 111, the first alternate cast configuration being constructed according to the present invention and being represented by reference numeral 211. For clarity, simplicity, and/or ease of illustration, certain details of cast configuration 211 that are discussed elsewhere in this application or that are not critical to an understanding of the invention may be omitted from the present specification and/or may be omitted from FIG. 3 or may be shown therein in a simplified manner.

Cast configuration 211, which may be used in system 111 in place of rolls 131, 133, and 135 and which may be regarded as an S-wrap cast configuration, may comprise a chilled roll 213, a chilled roll 215, and a roll 217. As can be appreciated, because of the different exit direction of cast configuration 211, as compared to that of system 111, if one were to incorporate cast configuration 211 into system 111, one would need to reposition second outlet 125 of enclosure 117.

Figure 4:
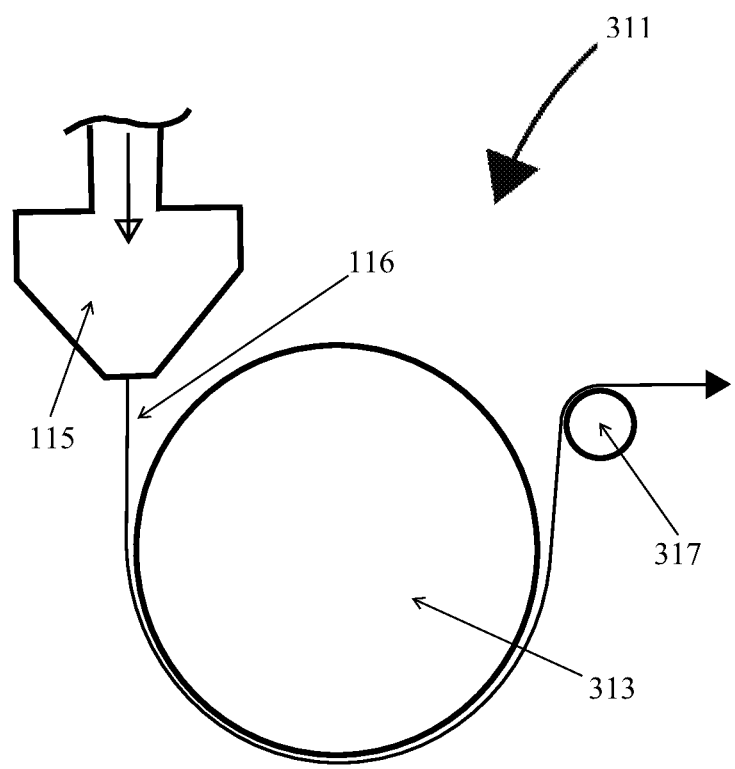
FIG. 4 is a schematic side view of a second alternate cast configuration to that shown in FIG. 2.

Referring now to FIG. 4, there is shown a schematic side view of a second alternate cast configuration to that shown in system 111, the second alternate cast configuration being constructed according to the present invention and being represented by reference numeral 311. For clarity, simplicity, and/or ease of illustration, certain details of cast configuration 311 that are discussed elsewhere in this application or that are not critical to an understanding of the invention may be omitted from the present specification and/or may be omitted from FIG. 4 or may be shown therein in a simplified manner.

Cast configuration 311, which may be used in system 111 in place of rolls 131, 133, and 135 and which may be regarded as a U-wrap cast configuration, may comprise a chilled roll 313 and a roll 317. As can be appreciated, because of the different exit direction of cast configuration 311, as compared to that of system 111, if one were to incorporate cast configuration 311 into system 111, one would need to reposition second outlet 125 of enclosure 117.

Referring now to FIG. 5, there is shown a schematic side view of a third alternate cast configuration to that shown in system 111, the third alternate cast configuration being constructed according to the present invention and being represented by reference numeral 411. For clarity, simplicity, and/or ease of illustration, certain details of cast configuration 411 that are discussed elsewhere in this application or that are not critical to an understanding of the invention may be omitted from the present specification and/or may be omitted from FIG. 5 or may be shown therein in a simplified manner.

Cast configuration 411, which may be used in system 111 in place of rolls 131, 133, and 135 and which may be regarded as a S-wrap cast configuration, may comprise a chilled roll 413, a chilled roll 415, and a roll 417. As can be appreciated, because of the different exit direction of cast configuration 411, as compared to that of system 111, if one were to incorporate cast configuration 411 into system 111, one would need to reposition second outlet 125 of enclosure 117.

The following examples are given for illustrative purposes only and are not meant to be a limitation on the invention described herein or on the claims appended hereto. All parts and percentages given in the description, examples and claims appended hereto are by weight unless otherwise stipulated. Further, all ranges of numbers provided herein above shall be deemed to specifically disclose all subset ranges of numbers within each given range.

EXAMPLES

The materials used:
  Polyethylene L5906 from Lyondell-Basell, La Porta, Texas, (MFI of 0.06) or Yuhwa, Seoul, Rep of Korea, grade Hiden VH035.
  Polyamide Grilamid L16, L25, CF6S from EMS, Sumter, South Carolina or 6434B, 5034B from Ube, Livonia, Michigan
  Mineral Spirits (MSB) having vapor pressure 3 mm Hg at 20° C., from MW Barr & Co. Inc., Memphis, Tennessee, or from Citgo, Houston, Texas, with the following vapor pressure characteristics:

| Temp (C.) | Vapor Pressure (mmHg) |
|---|---|
| 66 | 3.3 |
| 93 | 15 |
| 121 | 44 |
| 149 | 122 |
| 177 | 302 |
| 204 | 663 |

The equipment used was:
  Volumetric Feeder, Model #K2MVS60, by K-Tron Corp., Sewell, New Jersey
  Fluid pump, Neptune, Toronto, Canada, model 515AN3.
  Twin Screw Extruder (ZSK-30) made by Coperion Corporation, Ramsey, NJ, 07466
  Cast Film Take-up and MDO stretch made by Killion Extruders, a Davis Standard Company, of Pawcatuck, CT
  Tensile TDO stretcher by CSC Force Gauge, Agawam, MA, for transverse stretch.
  Bi-orientation tenter frame made by Marshall and Williams, Woonsocket, RI The following procedure was used to form each of the sheet products described in the Table below, as well as each of the comparative sheet products summarized in the Table below.

Specified amounts of polymer(s) were fed into a twin screw melt extruder via a volumetric feeder. The polymer(s) was (were) allowed to melt within the extruder and then specified amounts of fluid were introduced into the extruder via a metered pump. The polymer(s) and fluid were blended into a uniform fluid mixture. The total extrusion rate was set at between 3 and 5 kg/hr, as specified. The cast sheet speed was 2 ft/min. The melted mixture, called an extrudate, was formed into a cast sheet via a slot die. The sheet was cast into a cast roller take-off enclosure, similar to that shown in FIG. 4, having the die head enclosed therewithin and having a 10 mm slot opening where the die or melt extrudate may enter. The first fluid vapor was trapped within, creating an above-UEL condition. The vapor was then supersaturated and condensed onto a set of cooled S-wrap cast rollers. The extrudate cast sheet first contacted this above-UEL vapor zone before the cast rollers. One surface of the cast sheet contacted the first roller, and the second and opposite surface of the cast sheet contacted the second roller, where both surfaces were cooled.

The rollers were maintained at 50° C., and the condensate was formed of the same fluid that was used to form the polymer/fluid mixture. The molten sheet material was transformed from the liquid phase to a solid phase sheet material. After this liquid-solid transition, the sheet exited the enclosed cast tank via a second slot opening, and the vapor condition changed from the above-UEL zone within the tank to the below-LEL zone outside of this tank.

The sheet was sequentially stretched using a series of nip rollers in the machine direction, with each stretching conducted at a controlled temperature. Each stretching operation was conducted in a confined environment. The vapors from the first stretch were allowed to condense for collection. This first stretching/vaporization was conducted in a machine direction at 105° C. and at a ratio of 5.5:1 to cause crystallinity to be imparted to the first polymer of the first formed sheet while allowing a predetermined degree of fluid to remain.

The sheet was then subjected to stretching in a transverse direction at a controlled temperature(s) using a tenter apparatus. The stretching was conducted in the transverse direction at 30° C. and at a ratio of 4:1, with a current of air passing over the sheet material to aid in vaporizing and driving off the vaporized fluid.

The tenter force was adjusted to allow the sheet to be held under tension at an elevated temperature of 105° C. for 2 min to anneal and to set the sheet product. The properties of each of the formed sheet product are given in the Table below.

As indicated in the Table, Examples 1 and 2 showed improved side-to-side oil wet-out, where the surface pore size and porosity differences were minimized. By contrast, Example 3 (a comparative example), which was produced in an uncontrolled conventional method, showed significant oil wet-out time discrepancy, i.e., comparing the oil wet-out of the first and second surfaces. This difference is 20 seconds, or an increase of 60%. The measure of oil wet-out time is the time when a droplet of SAE 30 motor oil turns a separator sheet product from an opaque white color to a clear translucent appearance. This color change indicates a rate of oil penetration through both surfaces of the separator. Any one surface can exhibit an impediment.

Example 2 was tested in a lithium battery coin cell, as was a Celgard 2325 control separator. At a C/10 rate, both separators achieved a specific energy capacity of 180 mAh/g. At a C/2 rate, Example 2 achieved a specific energy capacity of 160 mAh/g, and the Celgard separator achieved a specific energy capacity of 151 mAh/g. The particulars of Examples 1-3 are summarized in the Table below:

TABLE

| | Example | | |
|---|---|---|---|
| | #1 | #2 | Comparative #3 |
| First Polymer Type | L5906 | L5906 | L5906 |
| Fluid 1 Type | Citgo spirits | Citgo spirits | Citgo spirits |
| Extrusion Polyethylene % | 40% | 39% | 36% |
| Extrusion Polyamide 12 (L25), % | 0% | 1% | 0% |
| Extrusion Fluid % | 60% | 60% | 64% |
| Extrusion Rate (kg/hr) | 4.2 | 4.2 | 5 |
| Extrusion Energy (kwh/kg) | 0.19 | 0.33 | 0.18 |
| Cast Vapor Type | Above-UEL Citgo spirits | Above-UEL Citgo spirits | Ambient air Below-LEL |
| Cast cooling liquid | Above-UEL Citgo spirits | Above-UEL Citgo spirits | none |
| Cooling Type | Cast roll S-wrap | Cast roll S-wrap | Cast roll, U wrap |
| Cooling Temperature (C.) | 50 | 50 | 20 |
| Thickness (microns) | 23.0 | 24.7 | 28.0 |
| Basis wt (gm/m · sq.) | 11.2 | 11.0 | 15.5 |
| Porosity (%) | 61% | 63% | 56% |
| Resistance (mohm-cm^2) | 1456 | 1556 | 2344 |
| Resistivity (ohm-cm) | 623 | 625 | 806 |
| Tensile MD (kg/cm^2) | 734 | 684 | 536 |

TABLE-continued

| | Example | | |
|---|---|---|---|
| | #1 | #2 | Comparative #3 |
| Tensile TD (kg/cm^2) | 350 | 230 | 291 |
| Elongation MD (%) | 140% | 105% | 55% |
| Elongation TD (%) | 375% | 225% | 135% |
| First surface Oil Wetout (sec.) | 35 | 32 | 33 |
| Second surface Oil Wetout (sec.) | 41 | 36 | 53 |
| Appearance: | Uniform opaque white | Uniform opaque white | Uniform opaque white |

Some of the differences between the present invention and existing approaches are as follows: Existing approaches do not direct one to the usage of the same high volatile solvent in extrusion, creating an above-UEL compatible gas phase forming agent, to coagulate and form a highly porous extruded cast sheet, further processed in a safe and efficient manner, limiting possible liquid solvent carryover through later processing steps, while achieving a thin, highly porous, and low resistance battery separator. Further, existing approaches do not teach the use of a high molecular weight condensation polymer to form the separator and to scavenge water and acid molecules within a lithium cell, where the polymer is cleaved, reducing in molecular weight while maintaining a certain minimum molecular weight to maintain polymer entanglement in a polyolefin matrix. The present invention enables one to obtain a sheet product that is surprisingly easy to process and stretch, that results in a highly uniform, homogeneous pore structure, that produces a sheet with high tensile strength and elongation, that achieves the above properties in a cost-effective, environmentally desired manufacturing manner, and that produces little or no waste stream.

In at least some embodiments, the microporous sheet product of the present invention may comprise a micro skin layer cast sheet, and, in at least some embodiments, the microporous sheet product of the present invention may be characterized by being high in electrolyte wet-out, high in wicking, and high in electrolytic conductivity. In addition, in at least some embodiments, the microporous sheet product of the present invention may comprise a polymer for scavenging water ($H_2O$) and/or acid (often in the form of hydrofluoric acid) to inhibit gassing and corrosion of the battery.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A lithium-based battery cell, the lithium-based battery cell comprising:
   (a) an electrolyte, the electrolyte comprising a non-aqueous solvent and a lithium salt, the lithium salt dissolved in the non-aqueous solvent;
   (b) an anode, the anode contacting the electrolyte;
   (c) a cathode, the cathode contacting the electrolyte;
   (d) a battery separator, the battery separator separating the anode and the cathode, wherein the battery separator is a microporous sheet product comprising a first polymer and a second polymer, the first polymer comprising a thermoplastic polymer, the second polymer comprising a condensation polymerization polymer that is produced in a dehydration polymerization reaction and that, when exposed to water, undergoes a reduction in molecular weight, wherein, at completion of cell manufacture, the second polymer has an initial total weight, and wherein the second polymer is selected from the group consisting of polyoxyethylene and polypropylene glycol; and
   (e) a housing, wherein the electrolyte, the anode, the cathode, and the battery separator are disposed within the housing;
   (f) wherein, at completion of cell manufacture, an initial amount of water having an initial total weight is present within the housing and wherein a ratio of the initial total weight of the second polymer to the initial total weight of water is in a range of about 10:1 to 5,000:1.

2. The lithium-based battery cell as claimed in claim 1 wherein the first polymer comprises at least one polyolefin selected from the group consisting of polyethylene, polypropylene, ethylene-butene copolymers, ethylene-hexene copolymers, and combinations thereof.

3. The lithium-based battery cell as claimed in claim 1 wherein the second polymer has a minimum entanglement molecular weight of at least 1000 Da.

4. The lithium-based battery cell as claimed in claim 1 wherein the microporous sheet product is made by a method comprising (a) melt-extruding an extrusion mixture to form a sheet material, the extrusion mixture comprising (i) the first polymer, (ii) the second polymer and (iii) a compatibilizing agent, the compatibilizing agent promoting mixing of the first and second polymers; and (b) then, cooling the sheet material, whereby micropores are formed in the sheet material.

5. The lithium-based battery cell as claimed in claim 1 wherein, after exposure to water, the second polymer undergoes a reduction in average molecular weight of between 20% and 90%, with a minimum cleavage ratio Rc of at least 1.1, wherein the minimum cleavage ratio is defined as average initial molecular weight of the condensation polymerization polymer divided by average final molecular weight of the condensation polymerization polymer after hydrolysis cleavage.

6. The lithium-based battery cell as claimed in claim 1 wherein the ratio of the initial total weight of the second polymer to the initial total weight of water is at least 50:1 and wherein the lithium-based battery cell initially contains, at completion of cell manufacture, greater than 10 ppm of water.

7. The lithium-based battery cell as claimed in claim 1 wherein the second polymer has an initial average molecular weight of at least 12,000 Da.

8. The lithium-based battery cell as claimed in claim 1 wherein the second polymer has an initial molecular weight of at least 110,000 Da.

9. The lithium-based battery cell as claimed in claim 1 wherein the second polymer and the first polymer have an initial average molecular weight ratio of below 2:1 and above 0.01:1, wherein the second polymer and the first polymer have an initial weight ratio of between 0.01:1 and 1:1, and wherein a ratio of average initial molecular weight of the second polymer to average final molecular weight of the second polymer is at least 1:1 and less than 1000:1.

10. The lithium-based battery cell as claimed in claim 4 wherein the compatibilizing agent comprises at least one organic fluid, wherein the first polymer constitutes about 10 to 60% by weight of the extrusion mixture, the second polymer constitutes about 2.1 to 9.9% by weight of the extrusion mixture, and the compatibilizing agent constitutes about 40 to 75% by weight of the extrusion mixture.

11. The lithium-based battery cell as claimed in claim 1 wherein the moisture in the separator is below 300 ppm and wherein the lithium-based battery cell initially contains, at completion of cell manufacture, greater than 40 ppm of water.

12. The lithium-based battery cell as claimed in claim 1 wherein the first polymer and the second polymer are molecularly interwoven using a total melting energy input of at least 0.15 kwh/kg.

13. The lithium-based battery cell as claimed in claim 1 wherein the ratio of the initial total weight of the second polymer to the initial total weight of water in the range of about 500:1 to 5,000:1.

14. A lithium-based battery cell, the lithium-based battery cell comprising:
   (a) an electrolyte, the electrolyte comprising a non-aqueous solvent and a lithium salt, the lithium salt dissolved in the non-aqueous solvent;
   (b) an anode, the anode contacting the electrolyte;
   (c) a cathode, the cathode contacting the electrolyte;
   (d) a battery separator, the battery separator separating the anode and the cathode, wherein the battery separator is a microporous sheet product comprising a first polymer and a second polymer, the first polymer comprising a thermoplastic polymer, the second polymer comprising a condensation polymerization polymer that is produced in a dehydration polymerization reaction and that, when exposed to water, undergoes a reduction in molecular weight, wherein, at completion of cell manufacture, the second polymer has an initial total weight, and wherein the second polymer comprises a homopolymer of polyoxyethylene and a copolymer of polyamide 6/12 and wherein an initial weight ratio of the homopolymer to the copolymer is in a range of 0.1:1 to 10:1; and
   (e) a housing, wherein the electrolyte, the anode, the cathode, and the battery separator are disposed within the housing;
   (f) wherein, at completion of cell manufacture, an initial amount of water having an initial total weight is present within the housing and wherein a ratio of the initial total weight of the second polymer to the initial total weight of water is in a range of about 10:1 to 5,000:1.

15. A lithium-based battery cell, the lithium-based battery cell comprising:
   (a) an electrolyte, the electrolyte comprising a non-aqueous solvent and a lithium salt, the lithium salt dissolved in the non-aqueous solvent;
   (b) an anode, the anode contacting the electrolyte;
   (c) a cathode, the cathode contacting the electrolyte;
   (d) a battery separator, the battery separator separating the anode and the cathode, wherein the battery separator is a microporous sheet product comprising a first polymer and a second polymer, the first polymer comprising a thermoplastic polymer, the second polymer comprising a condensation polymerization polymer that is produced in a dehydration polymerization reaction and that, when exposed to water, undergoes a reduction in molecular weight, wherein, at completion of cell manufacture, the second polymer has an initial total weight, and wherein the microporous sheet product is a multilayered structure comprising a core layer and two outer layers, with each layer of the multilayered structure comprising the thermoplastic polymer and the condensation polymerization polymer, and wherein a ratio of the condensation polymerization polymer to the thermoplastic polymer is at least 1.5 times greater in the core layer than in the outer layers; and
   (e) a housing, wherein the electrolyte, the anode, the cathode, and the battery separator are disposed within the housing;
   (f) wherein, at completion of cell manufacture, an initial amount of water having an initial total weight is present within the housing and wherein a ratio of the initial total weight of the second polymer to the initial total weight of water is in a range of about 10:1 to 5,000:1.

16. The lithium-based battery cell as claimed in claim 15 wherein the second polymer is at least one member selected from the group consisting of polyamide, polyether, polyester, polyoxyethylene, polyethylene glycol, polypropylene glycol, polycarbonate, polyanhydride, polyimide, polybenzimidazole, polyacetal, polysulfone, polyphenylene oxide, and polyurethane.

17. The lithium-based battery cell as claimed in claim 15 wherein the second polymer comprises at least one of (i) a copolymer, (ii) a terpolymer, and (iii) a mixture of at least two polymers, at least one of the at least two polymers of the mixture being a copolymer, wherein an initial weight ratio of the copolymer of the mixture to the total condensation polymerization polymer is 0.1:1 to 0.9:1.

18. The lithium-based battery cell as claimed in claim 15 wherein the second polymer comprises at least one polyamide and wherein the at least one polyamide is selected from the group consisting of at least one homopolymer, at least one copolymer, at least one terpolymer, and combinations thereof.

19. The lithium-based battery cell as claimed in claim 18 wherein the at least one polyamide has a relative viscosity, as compared to m-Cresol, of at least 1.4:1.

* * * * *